United States Patent [19]

David

[11] Patent Number: 4,815,294
[45] Date of Patent: Mar. 28, 1989

[54] GAS TURBINE WITH EXTERNAL FREE-PISTON COMBUSTOR

[76] Inventor: Constant V. David, 4952 Field St., San Diego, Calif. 92110

[21] Appl. No.: 85,359

[22] Filed: Aug. 14, 1987

[51] Int. Cl.$^4$ .............................................. F02B 71/04
[52] U.S. Cl. ................................... 60/595; 123/46 A; 384/100
[58] Field of Search ............................ 60/595, 39.161; 123/46 R, 46 A; 384/100

[56] References Cited

U.S. PATENT DOCUMENTS

| | | | |
|---|---|---|---|
| 3,005,306 | 10/1961 | Bush | 60/595 |
| 4,118,927 | 10/1978 | Kronogard | 60/39.161 |
| 4,332,427 | 6/1982 | Sargent et al. | 384/100 |

Primary Examiner—Stephen F. Husar

[57] ABSTRACT

AN external-combustion gas turbine in which the fuel combustion takes place in a free-piston combustor. The gas turbine is the motor component of this type of engine and provides external power by means of its shaft. The gas turbine comprises an air compressor and a combusted gas expander both mounted on that same shaft. The compressed air output is directed to a storage-tank and heat-exchanger combination. The air is then admitted in the valve-less free-piston combustor and further compressed. Fuel is burned therein which further raises the pressure of the combusted gas resulting therefrom. The combusted gas is then directed to the storage tank where it exchanges some of its heat content with the compressed air. The combusted gas is then ducted into the turbine inlet and expands therein, providing energy to drive the compressor and yield shaft power. The coupling of motor, fuel combustion process and combusted-gas-pressure raising results in an engine that combines some of the advantages of Diesel engines, gas turbines and Otto-cycle engines, while eliminating some of the disadvantages of each one. This new external combustion engine operates totally differently from Diesel or Otto engines equipped with turbo-chargers and is not to be confused with either.

23 Claims, 3 Drawing Sheets

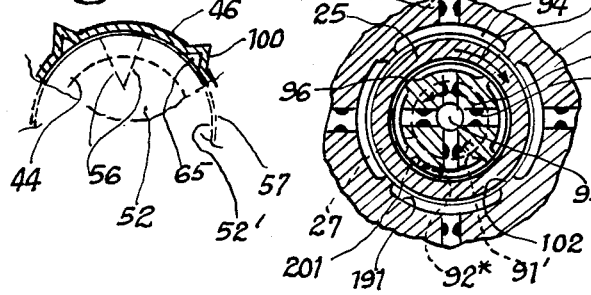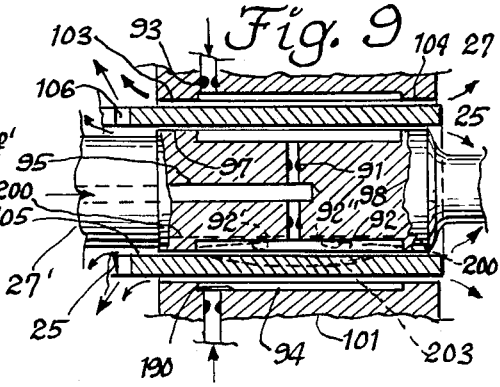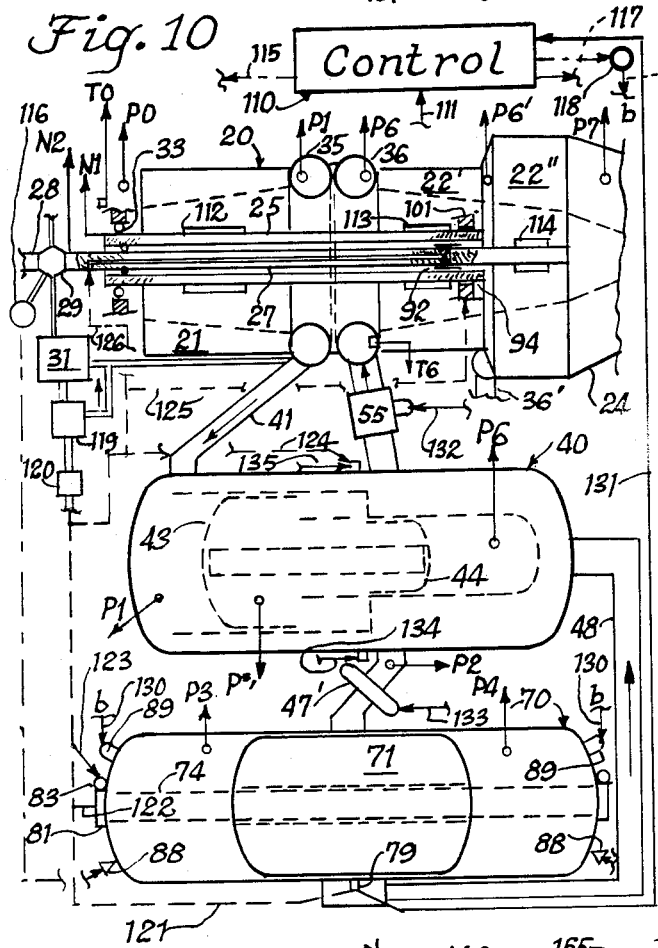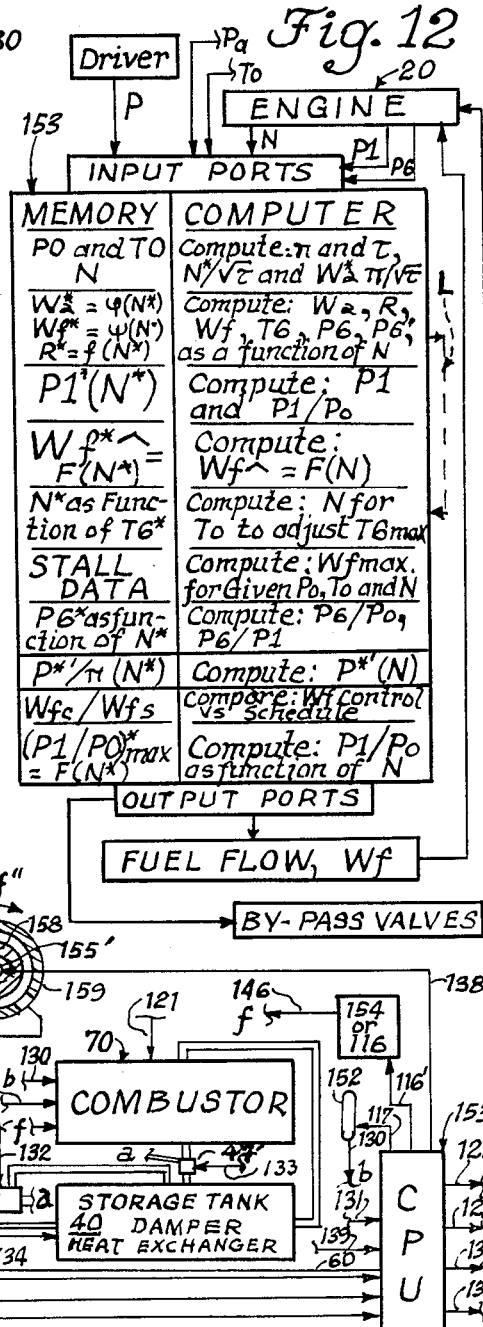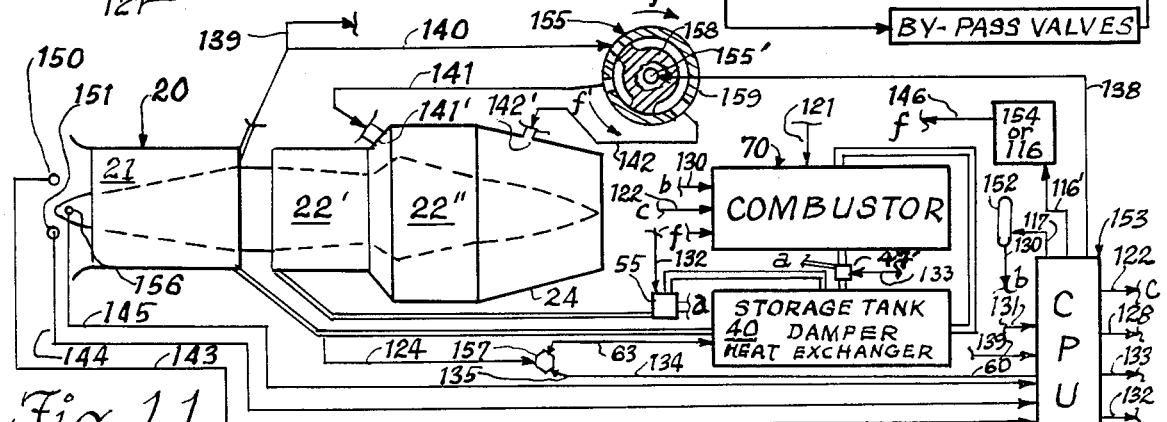

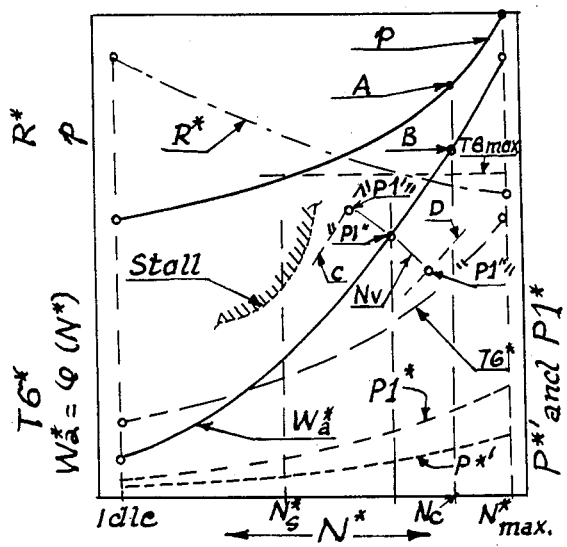
Fig. 13
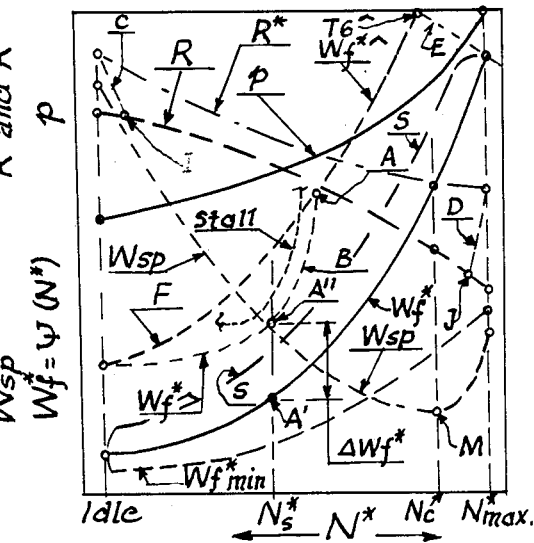
Fig. 14
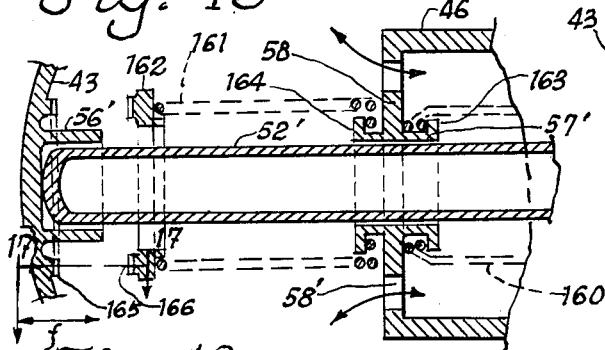
Fig. 15
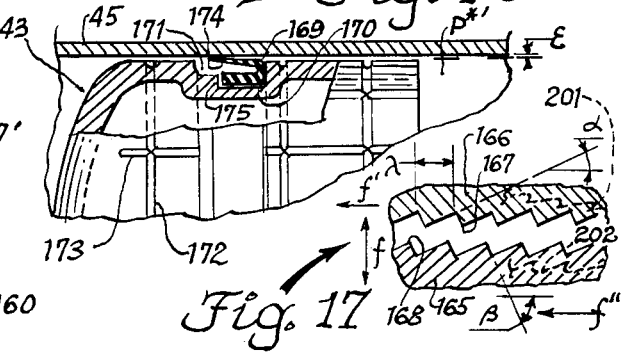
Fig. 16
Fig. 17
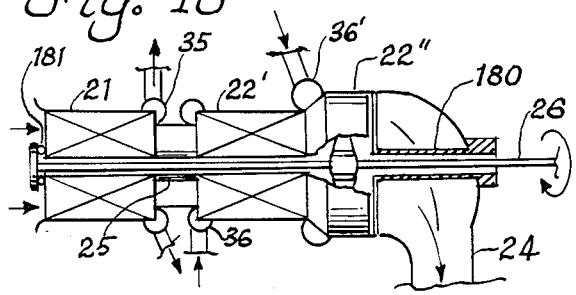
Fig. 18
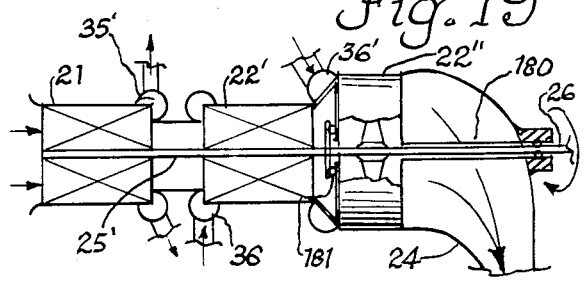
Fig. 19
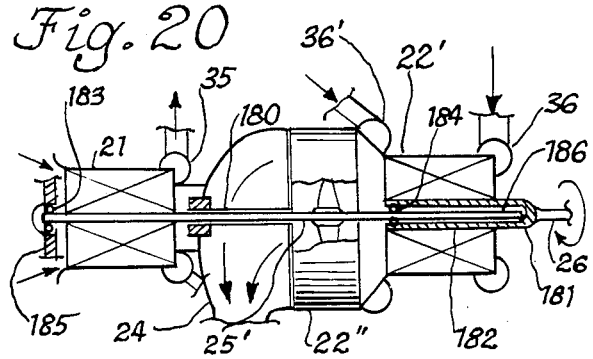
Fig. 20
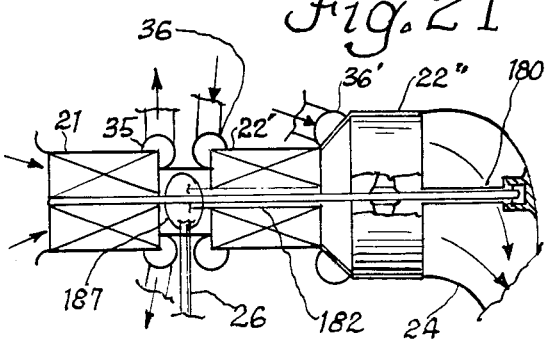
Fig. 21

GAS TURBINE WITH EXTERNAL FREE-PISTON COMBUSTOR

BACKGROUND OF THE INVENTION

The present invention relates to an external combustion engine which combines some of the advantages of gas turbines and piston engines by means of the use of a valve-less free-piston combustor. The use of gas turbines in conjunction with that of piston engines is well known and widely used in the form of turbo-chargers. The present invention engine differs from such turbo-charged piston engines in that: (1) the combusted gas is expanded in the turbine to produce the engine shaft power, (2) no shaft power is directly extracted from the energy generated by the free-piston member, and (3) the turbine admission pressure may be appreciably higher than that of the compressed air entering the combustor. The latter characteristic also differentiates it from conventional gas turbines.

External combustion engines (EC engines as opposed to IC engines) have been the object of a few patents, in the recent past, and been granted to the present inventor. These are mentioned here as pertinent references hereto:

1. U.S. Pat. No. 4,399,654 issued Aug. 23, 1983. Pending in Japan: Application No. 024912/83 filed Feb. 19, 1982; and in the European Patent Office: Application No. 83300628.1 filed 08/02/83.
2. U.S. Pat. No. 4,561,252 issued Dec. 31, 1985.
3. U.S. Pat. No. 4,653,273 issued Mar. 31, 1987.
3. U.S. Pat. No. 4,653,274 issued Mar. 31, 1987.
4. U.S. Pat. No. 4,662,177 issued May 5, 1987.
5. U.S. Pat. No. 4,665,703 issued May 19, 1987.
6. U.S. Pat. No. 4,672,813 issued June 16, 1987.
7. U.S. Pat. No. 4,702,205 issued Oct. 27, 1987.
8. U.S. patent application Ser. No. 893,701 filed 08/06/86, now abandoned, entitled "External Combustion Rotary Engine".

The free-piston combustor construction has evolved into a configuration in which piston friction is eliminated by means of a plurality of compressed air cushions isolating the oscillating piston from the sleeve. The pulsed-combustion frequency is one tenth of that which characterizes conventional piston engines. Considerable more time is thus available to burn less volatile fuels more effectively. Motors are of the vane or rotary types. Compressed-air cushioning of moving parts is widely used so as to eliminate friction and the need of lubrication. However, some of the congenital disadvantages of the motor types just mentioned such as: need of valves in rotary motors, vane vibrations in vane motors and rotational speed (rpm) limitations for both, point to the direction of gas turbines as ideal motors. Because of their much higher rpm characteristics, continuous air-/gas flow feature, absence of contact between moving parts, etc., gas turbines yield a very high ratio of shaft power to both volume and weight. However, they were limited until recently by some inherent drawbacks such as: relatively low efficiency (high fuel consumption), need of a high-ratio down-gearing and high cost.

Thermodynamic efficiency can be improved appreciably by way of higher turbine operating temperatures which the advent of ceramic materials has made possible. The use of a free-piston combustor permits to lower the maximum rpm of the turbine, while enabling both the overall compression ratio of the engine and its peak operating temperatures to increase. The concomitant result is an appreciable increase in engine overall efficiency.

In view of this background, it is therefore desirable to combine the advantages mentioned above while minimizing the influence of or eliminating the disadvantages also mentioned above for each type of motors. This combination of various technologies results in a new type of hybrid engine with considerable promises.

SUMMARY OF THE INVENTION

It is therefore a primary object of the present invention to provide a new type of engine in which the advantages of gas turbines and free-piston combustors are combined so as to yield higher efficiencies, i.e. lower specific fuel consumption.

It is another object of the present invention to provide an EC engine that can burn less volatile fuels more efficiently.

It is another object of the present invention to provide an EC engine in which the use of new materials such as ceramics can be efficiently and most beneficially exploited.

It is another object of the present invention to provide an EC engine in which lubrication is not needed.

It is another object of the present invention to provide an EC engine that produces less pollutants, especially $NO_x$.

It is another object of the present invention to provide an EC engine motor that is simpler in construction than vane motors.

Finally it is still another object of the present invention to provide an external combustion engine that has a higher ratio of shaft power to weight and/or volume than do external combustion engines using vane motors and/or rotary motors.

DESCRIPTION OF THE DRAWINGS

FIG. 7 is a cross-sectional schematic of a V-shaped groove used as variable-size restricting orifice taken along section line 7—7 of FIG. 2.

FIG. 8 is a cross-sectional view of a double-bearing system using air cushion pads between two concentric shafts.

FIG. 9 is a longitudinal sectional view of the double bearing of FIG. 8 shown with air cushion pads and feed air-ducts.

FIG. 10 is a functional schematic of a control system used to regulate the various air and gas flows throughout the engine.

FIG. 11 is a block diagram depicting the operation of the control system of the present invention EC engine.

FIG. 12 is a flow chart illustrating the signal and data processing performed by the control system of FIGS. 10 and 11.

FIG. 13 is a graphic representation of typical engine operating parameters shown in their dimensionless form.

FIG. 14 is a graphic representation of engine fuel needs as a function of engine regime shown in dimensionless forms.

FIG. 15 is a partial sectional view of an alternate design of the Storage-Tank/Heat-Exchanger/Damper double-piston assembly.

FIG. 16 is a partial sectional detail view of the sliding seal of one of the two pistons of the assembly of FIG. 15 above.

FIG. 17 is a detailed local sectional view of a piston-rotation actuating mechanism taken along line 17—17 of FIG. 15.

FIG. 18 is a first alternate engine configuration shown as an example of another compressor/turbine/-drive-shaft arrangement.

FIG. 19 is a second alternate configuration of the engine.

FIG. 20 is a third alternate configuration of the engine.

FIG. 21 is a fourth alternate configuration of the engine.

DETAILED DESCRIPTION OF THE INVENTION

Figure 1:
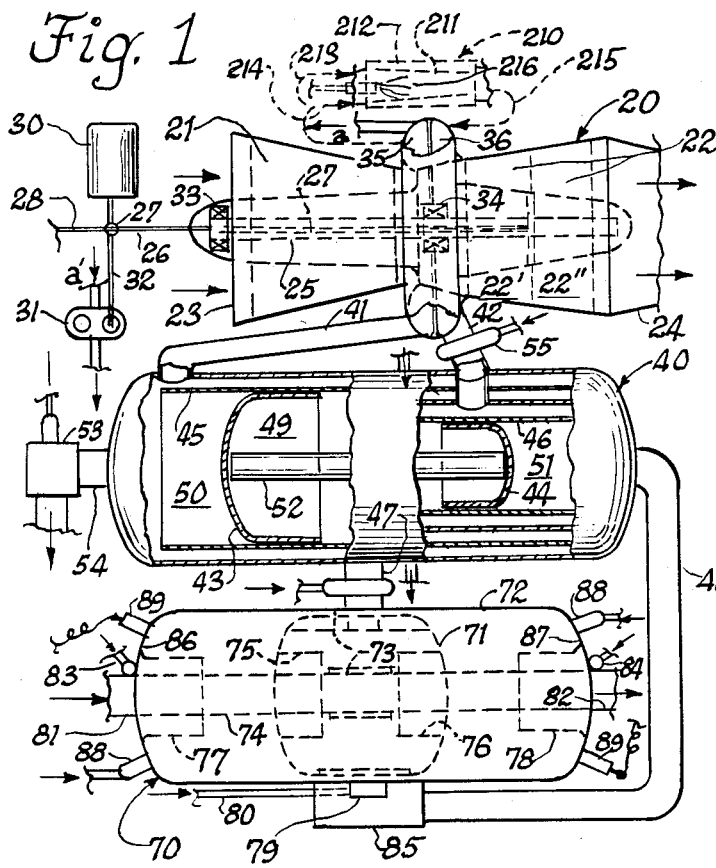
FIG. 1 is a schematic midsectional elevation view of an external combustion engine representative of the present invention.
Figure 2:
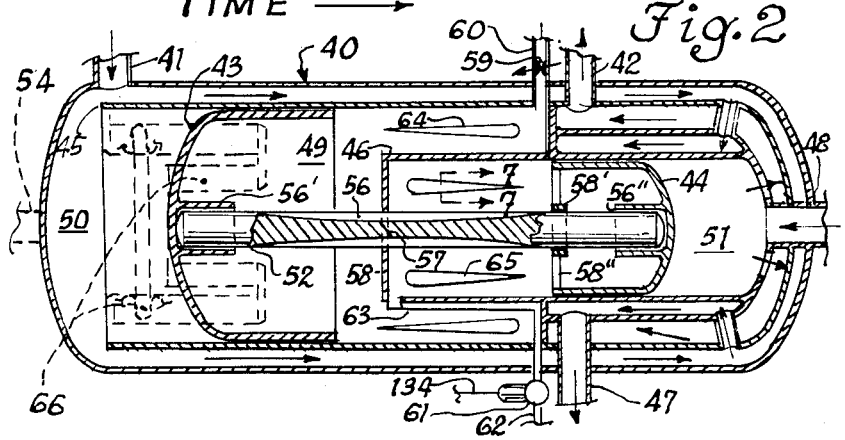
FIG. 2 is a schematic midsectional elevation view of the storage-tank/heat-exchanger member of the EC engine of FIG. 1.

Referring to FIGS. 1 and 2 of the drawings, the motor member 20 is typically represented by a combination of axial compressor 21 and twin-spool turbine 22. Ambient air enters motor 20 through inlet 23 and combusted gas exhausts through tailpipe 24. A spool of turbine 22 is connected to compressor 21 by shaft 25 and the other spool is linked to drive shaft 26 by means of inner shaft 27 located inside annular shaft 25. Shaft 26 drives power shaft 28 and various engine accessories or components by means of gearbox 29. Two such typical accessories are starter/generator 30 and high-pressure compressor 31 driven by shaft 32. Shafts 25 and 27 are supported by bearings such as 33 and 34. Internal bearings located between the two concentric shafts are not shown, the technology being well known in the art. The compressed air output of compressor 21 is received by collecting manifold 35 and the combusted gas input to turbine 22 is supplied by manifold 36. As is obvious from the drawing, the customary combustion chamber located between compressed air output and turbine gas input is absent but is shown in dotted lines above motor 20 for comparison and reference only, it is not part of the invention. This is discussed in the next section.

In the present invention, the compressed air is ducted from manifold 35 into storage-tank/heat-exchanger member 40 through duct 41. The combusted gas is channelled from member 40 to manifold 36 by means of duct 42. The role and operation of member 40 are explained and discussed in the next section. One function of member 40 is to provide an expandable storage space for both compressed air and combusted gas so as to attenuate the rapid fluctuations in pressure which are caused by changes in fluid flows, i.e. from continuous (compressor and turbine) to pulsating (free-piston combustor). The storage-space volume is rendered variable by means of light-weight pistons 43 and 44, slidingly guided by sleeves 45 and 46, respectively. Heat is exchanged between compressed air that exhausts through duct 47 and combusted gas that is admitted through duct 48. The regulated air pressure in space volume 49 is lower than either of the pressures existing in spaces 50 and/or 51. Both pistons 43 and 44 are thus constantly pushed against each other and are kept apart by stem 52 so as to force the pistons and their separating stem to move as one assembly. A control valve 53 is connected to space 50 by duct 54. The combusted gas input to turbine 22 is regulated by means of valve 55. Valve-53 and -55 roles are discussed later as needed.

FIG. 2 presents a more detailed drawing of member 40 so that the air and gas flows throughout the heat exchanger can be more easy to follow. The various flow paths are indicated by arrows and are self explaining. Stem-52/Pistons-43-44 assembly is free to slide axially and it must be maintained in a mean position between both ends of its available stroke so as to be able to provide an unhampered damping response to the solicitations of the fluctuating pressures in spaces 50 and 51. One first way to insure such positioning is by means of grooves such as 56 cut in stem 52 body. These grooves cooperate with the edges of hole 57 in flange 58 to form restricting orifices of variable areas. The air pressure in space 49 is regulated by means of adjustable restricting orifice 59 installed in duct 60 and operating in cooperation with control valve 61 mounted on duct 62. The pressurized air is channelled through pipe 63 and forced to pass through the restricting orifices formed by grooves 56. In addition, to facilitate such self-positioning action, pluralities of grooves such as 64 and 65 are also present on the inner cylindrical surfaces of sleeves 45 and 46, respectively. The combined cooperations of these grooves with pistons 43 and 44 lands, and stem 52 grooves, are discussed in the next section.

Another way to impose a set rest or mean position on the pistons/stem assembly is to replace piston 43 by bellows system 66, shown in dotted lines as an alternate embodiment. As noted in a discussion of this feature in the next section, such bellows can have enough flexibility and lightness to render their use preferable to that of piston 43 that operates at a much lower temperature than does piston 44. Using bellows is preferable to using a piston-spring combination in this application for reasons given in the next section. A typical shape of grooves 64 and 65 (or for that matter of grooves 56) is illustrated in FIG. 7 schematic. The lengths of these grooves must of course be larger than that of the lands of the pistons with which they functionally cooperate. The presence of hot combusted gas in the neighborhood of piston 43 (or especially of bellows 66) is avoided. That is performed by way of segregating the air and gas parallel ducting in the right hand portion of member 40.

The combustion of fuel in compressed air takes place in combustor member 70 including a free piston 71 sliding from one end of sleeve 72 to the other in an oscillating and reciprocating motion. As described and discussed in great details in references (1) and (5), piston 71 is urged in the course of such reciprocating motion to follow a coordinated and synchronized oscillating rotational motion. The cooperating action of these two coordinated motions enables piston 71 land to serve as a registering sliding surface in an automatic valving mode for both compressed air and combusted gas. The assistance of any other moving parts is not required. Reference 5. indicates how and why free piston 71 can be concurrently prevented from contacting sleeve 72 by means of automatically controlled and self-adjusting air cushions 73. Central tube 74 along which piston 71 also slides is also isolated from the piston by air cushions. This centrally located support provided to piston 71 is also used for non-contacting restraint of piston 71 in a tilting mode which could be incited by the valving means operation.

Free piston 71 also houses two cavities 75 and 76 shaped and dimensioned to fit around protuberances 77 and 78 that cooperate with cavities 75 and 76 respectively for providing air-cushioned shock absorbers. The role of these shock absorbers is to minimize the amount of stressful loads that would otherwise be exerted on the mechanisms that urge and facilitate the two coordinated oscillating modes of the free piston. Also, these protuberances and their associated cooperating cavities house and provide a means for locking piston 71 in its rest position which is at either of the two ends of sleeve 72. Piston 71 position is sensed pneumatically by means of sensor 79 connected to high-pressure air line 80. The high-pressure air needed for the operation of the air cushions is provided by duct 81 and 82. The locking or clamping mechanisms required for piston 71 are actuated by means of air at high pressure channelled in by manifolds 83 and 84 as shown. The combusted gas is collected by manifold 85.

Each end closure 86 or 87 of sleeve 72 also supports both a fuel injector 88 and a high energy spark plug 89. The control and timing of both fuel injection and spark plug activation for fuel ignition are described and discussed in detail in reference 5. A summary timing diagram of the valving means operation and of fuel injection and ignition is presented in FIG. 6 below FIG. 1. The letters R and L refer to the right and left combustion chambers, two such chambers being provided, on at each sleeve end closure. The letters C and O refer to the valving means being closed and open, respectively. It is evident that the inlet and outlet valving means of a combustion chamber should not be opened at the same time. On the other hand, it is advantageous to provide a continuous flow of combusted gas, which is what the two outlet valving means do as shown by the curve in dotted lines and labelled "Total Outlet". However, the compressed air admission to the combustor member cannot be continuous, for it must provide for fuel injection and ignition times during which the combustion chamber must be closed off. In addition, a time period must also be provided when the combustion chamber is closed off for allowing the combusted gas just produced to expand somewhat so as to force combusted gas out of the other combustion chamber. This process is described and discussed in detail in references (1) and (5). The pulsating character of the compressed air admission is of more significance when the motor member is a gas turbine, as discussed in the next section.

Figure 3:
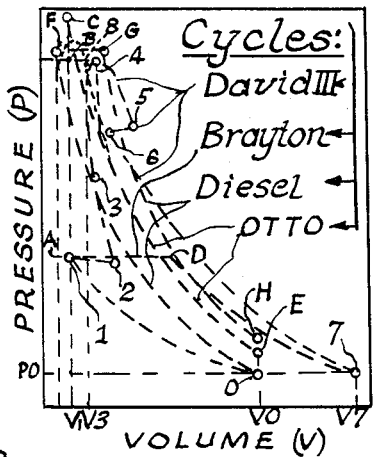
FIG. 3 is a P-V diagram illustrating the operating cycle of the subject engine as compared to those of other engine types.
Figure 4:
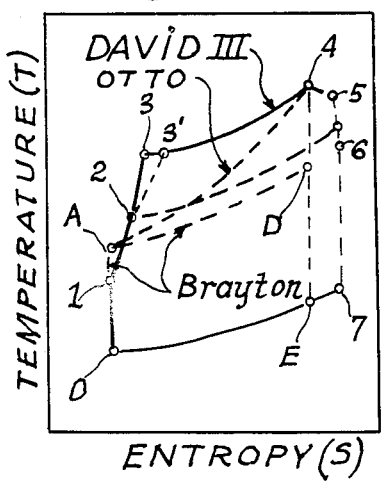
FIG. 4 is a T-S diagram illustrating the operating cycle of the subject engine as compared to those of other engine types.
Figure 5:
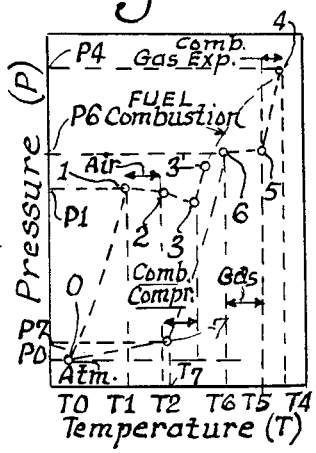
FIG. 5 is pressure-temperature diagram depicting the operation of the subject engine according to its cycle definition.

FIGS. 3 to 5 diagrams illustrate thermodynamic cycles that represent the operation of standard gasoline engines (OTTO Cycle), of gas turbines (Brayton Cycle or Joule Cycle), Diesel Cycle engines and of the engine of the present invention (David III Cycle). For consistency with the appellation convention established in reference 5. in which David I and David II Cycles refer to engine operating modes similar to the OTTO and DIESEL Cycles, respectively, David III Cycles as used in the present engine. The P-V and T-S diagrams of FIGS. 3 and 4 are well known in the art, and T-S diagrams for specific combinations of air and fuels have been developed and are used extensively by thermodynamicists. This type of diagrams enables the engine designers to determine the thermodynamic efficiency of a given engine cycle very readily. However, the cycle of the present engine is rather complex because of the heat exchange process involved and of the manner by which mechanical energy is extracted from the engine.

For these reasons, another diagram is presented in FIG. 5 in which the concomitant variations of pressure and temperature are indicated, as one follows an air particle from the engine air inlet to the combusted gas exhaust. This mode of representation of the engine operation is of a descriptive nature and should not be construed as the equivalent of a thermodynamic cycle. Ambient air enters compressor 21 at Po and To (point 0) and is compressed to point 1 where the compressed air leaves compressor 21. A small pressure drop occurs between points 1 and 2 while the compressed air travels through heat exchanger 40 and is heated. Between points 2 and 3, the heated compressed air pressure decreases slightly. As fuel is injected and ignited between points 3 and 4, compression of combusted-gas/compressed-air mixture takes place, until all fuel is burned. Between points 4 and 5, the combusted gas expands somewhat without losing much heat. From points 5 to 6, the combusted gas is cooled down, its pressure drops slightly and it leaves heat exchanger member 40 at point 6. Between points 6 and 7, the combusted gas expands through turbine 22, first in spool 22' and then in spool 22" expansion spaces. At point 7, the low pressure combusted gas, still hot (temperature T7), enters tailpipe or exhaust pipe 24. The pressure drop from point 7 to point 0 (ambient atmosphere) is both needed to push the combustion gas out and wasted in terms of the latent energy it still contains. The significance of both the heat exchange between compressed air and combusted gas and the lowering of temperature T6 to temperature T5 is discussed in the next section.

In the schematic of FIG. 7, two V-groove cross-sections are depicted, one shown in solid lines corresponds to a groove 65 of FIG. 2, the other shown in dotted lines corresponds to a groove 56 also of FIG. 2. The thickness of sleeve 46 may not be sufficient to accommodate the maximum depth of grooves 65 required. In such case, the outer surface of sleeve 46 may be formed to adopt the shape illustrated by raised triangularly-shaped contour 100. Such raised contour extends only the length of grooves 65 as and where needed. Phantom line 57 corresponds to the edge of hole 57 of FIG. 2 and is associated with phantom line 52' that represents the outer cylindrical surface of stem 52 in that case.

FIGS. 8 and 9 illustrate the construction of a double air cushion bearing in which two rings of air pads are concentrically positioned, one pad ring facing one associated surface of an annular shaft having inner and outer concentric surfaces. Central shaft 27 may support spool 22" and annular shaft 25 may support spool 22' and be connected to compressor 21 for instance. Such a shift arrangement configuration is only examplary and not meant to be limitative. A structure 101 supports the outer surface of shaft 25 and the inner surface of shaft 25 in turn supports central shaft 27. The use of air bearings is advantageous for supporting the shafts at all stations located right of bearing 34 in FIG. 1 because of the high temperatures existing in the vicinity of turbine elements. The use and operation of automatically self-centering single bearing using air-cushion pads are extensively described and discussed in references (6), (7) and (8), thus require no explanation here. Each single-bearing component of a double bearing is used and operates as do the bearings discussed in the cited references. Four air cushions per bearing are shown as construction example, a minimum number being three with no upper limit for the maximum number, except for practical reasons.

In double air-bearing support systems, the possibility exists that a resonance condition could develop. Thus, it might be prudent in practice to use different numbers of air pads (cushions) for each bearing ring, e.g. 3 and 4, 3 and 5, 4 and 5, etc. ... in order to obtain a very high first harmonic. For simplicity sake, in FIGS. 8 and 9, the same number of pads is shown for both bearing rings, i.e. four. In any event, all pads of one bearing ring have the same shape and size and are supplied with high-pressure air from a common source. All restricting orifices such as 91 or 93 located upstream of their respective air pads such as 92 or 94 have the same flow characteristics.

Air for pads 92 is channelled through hole 95 and air for pads 94 is brought in by ducting means not shown but located in structure 101. In all instances, air escapes through gaps formed between lands surrounding the pad such as 96, 97 and 98 for the pads of the inner bearing, and such as 102, 103 and 104 for the pads of the outer bearing, and the associated cylindrical surface of annular shaft 25. Arrows indicate where this escaping air flows. In the case of the inner bearing air pads, the air escaping in annular space 105 is further enabled to flow therefrom through a plurality of venting holes such as 106. The air escape gaps are sized to minimize the amount of high-pressure air loss. This is further discussed in the following section.

FIG. 10 depicts the engine overall arrangement already described for FIG. 1 but omits certain component details and incorporate engine operational and functional features that are needed for the engine control. The control of the engine is accomplished by means of specific components or accessories whose operations are regulated by a control system represented by block 110. This control system receives signals representing values of various engine operating parameters, processes them and generates command signals that are sent to the associated components in response to the power level demand represented by signal line 111. Basically, these components can be separated in five groups, each group being distinguishable by its role. They are: (1) turbine-operation control system, (2) combustor-operation system, (3) storage-tank/heat-exchanger control system, (4) air-cushion control system, (5) fuel delivery rate and ignition system. The functions and control of these five systems overlap and/or interact in various ways and for various reasons that will become more clear later on in the discussion section. In this description section, however, no distinctions regarding such interactions are made. The type of supply and/or signal lines is indicated by the kind of representating graphic line. Signal lines are shown in solid lines, high-pressure air lines are shown in phantom lines and lines pertaining to fuel delivery and ignition are shown in dash-dot-dash lines. Compressed air and combusted gas ducts are shown by double solid lines. The significant components and/or parts earlier identified are called out again for clarification. Additional accessories, parts and/or lines are now identified below.

Two temperatures of particular interest T0 and T6 are sensed at the locations identified by a small square. The pressures P0, P1, P2, P3, P4, P6 and P7 earlier mentioned are sensed at the locations identified by a small circle. Corresponding signals are sent to control system 110 for processing. Pressure P6' at the power turbine inlet is also sensed and utilized. Control air pressure P*' between pistons 43 and 44 is also sensed or regulated. Securing of compressor 21 and turbine spools 22' and 22" to their respective shafts is indicted by reference numbers 112, 113 and 114 respectively. The fuel delivery and ignition system comprises signal line 115 to fuel pump 116 that delivers fuel to injectors 88, and a signal line 117 to activation and ignition device 118 that energizes high-energy spark plugs 89. The fuel tank and boost pump are omitted, being well known in the art. Similarly, the source of electricity needed by device 118 is also omitted.

The high-pressure air is tapped from manifold 35 as compressed air and supplied to compressor 31. Its outlet pressure is regulated to a set level by pressure regulator 119 and filtered by air filter 120. The filtered high-pressure air is then delivered by lines 121, 122, 123, 124, 125 and 126 to piston-location sensor 79, the free-piston air cushion system, the free-piston locking system, pressure P*' regulating system, the inner-ring air bearing of central shaft 27 and the outer-ring air bearing of annular shaft 25, respectively.

The gas turbine is characterized by the rotational speeds N1 and N2 of its two shafts 25 and 27, respectively. These parameters are sensed and two sets of corresponding signals are sent to control system 110. As is discussed in the next section, the operation of gas turbines is sensitive to and well defined by a proper combination of rotational speed and ratio of the inlet to output pressures of both the compressor and the turbine spools.

Various other signal or function lines are: high-energy lead 130 connecting device 118 to both spark plugs, signal line 131 indicating the free piston position, signal line 132 controlling combusted-gas admission valve 55, signal line 133 controlling compressed-air admission valve 47' and signal or control lines 134 and 135 for adjusting the two restricting orifices mounted in series that are used for regulating pressure P*'. When a line is interrupted for ease of graphic presentation, such "connectable" interruptions are identified by corresponding letters such as b-b, etc. ... unless otherwise evident from the repeating of identical reference numbers.

The control system of the compressor-turbine motor is illustrated in more details in the block diagram of FIG. 11 and the corresponding flow chart diagram of FIG. 12. The engine control preferred approach as used here for application to the engine of the present invention is based on the rationale that scheduling fuel delivery to the combustor in response to engine requirement can be simpler, more economical and more reliable than closed-loop regulating systems. This is especially true in the case of high-temperature controls. End results representing indirectly average temperatures in hot gas flows may also be more correct and more relevant in terms of representing a better measure of the effects of high temperatures on some engine critical parts. The fuel delivery to the engine combustor is thus: (1) scheduled in a continuously adjustable way by the engine power level set by the driver according to a pre-programmed fuel schedule fixed as a function of engine regime (rpm), and (2) regulated according to a closed-loop control system only when one critical engine operating parameter reaches a limit above which engine operation is deemed unsafe, in which case the fuel delivery rate determined by the schedule is superseded by the overriding action of the regulation. The dimensionless character of the operating engine parameters of interest is described and discussed in the next section. The applicable and useful dimensionless data is presented in FIGS. 13 and 14. FIGS. 11 to 14 summarize both the method and the implementation thereof for controlling the present engine operation regardless of pressure and temperature variations in atmospheric conditions. Actual ambient air pressure Po and temperature Po, and their homologues PO and TO corresponding to Standard Atmosphere Sea Level values, represent the dimensions that need be eliminated from the engine operating parameters in question. The manner by which this is achieved is also described and discussed in the next section. The actual values of these parameters have no asterisk sign, the corresponding dimensionless values of these parameters are shown with an asterik sign. The only exceptions are $P^{*'}$, $p^*$ and $p^{**}$ as previously and later identified. The actual values of $P^{*'}$ must be continuously adjusted between P1 and Po by means of a pneumatic potentiometer described and discussed in reference 5 for instance. The correcting of $P^{*'}$ according to the value of Po/PO is automatic, because P1 also varies as Po/PO, equal to $\pi$. The manner and the extent by which $P^{*'}$ varies are discussed in the next section. Suffice it to indicate here that to each value of $N^*$ (rpm dimensionless expression) corresponds one single value of $\pi \cdot P^{*'}$. With such qualifications, the contents of FIGS. 11 to 14 may now be described.

The preferred embodiment of such control system is summed up by FIG. 11 block diagram. Engine 20, compressor 21, turbine spools 22' and 22", combustor 70 and storage-tank/heat-exchanger/damper 40 have already been identified and described. Additional components of the control system earlier referred to as 110 in FIG. 10 include: a central processing unit (CPU) 153, a fuel supply and metering/delivery system 154, an electrical power source and ignition activation system 152, a three-way by-pass valve 155, an air inlet pressure sensor 151, an air inlet temperature sensor 150, an rpm- or N-sensor 156, a pneumatic-potentiometer valving system 157 for regulating $P^{*'}$ and accompanying associated sets of signal lines and ducts for compressed air and combusted gas. Valves 55 and 47' previously identified are also indicated. The role and operation of the CPU are described below and partially in FIG.-11 flow chart diagram for that portion of the control system that is specific to the engine of the present invention, and further discussed in the next section. The roles of the other components pertinent to the present engine, are described below.

As discussed in the next section and for the reasons presented therein, a simplified basic embodiment of the control system is reduced to sensing and using N1, referred to hereinafter as N, as the only indication of engine regime and lower level. Also it should be mentioned here that N2 results from the automatic power loading imposed on turbine spool 22" and is regulated by the power requirements and variations thereof developed by the power-using system actuated by drive shaft 26. It is assumed that this power-using system, e.g. car, automatically limits N2. However, if by error, the power-using system becomes disengaged from drive shaft 26 when the fuel delivery to the engine has not yet been correspondingly adjusted, a run-away condition of turbine spool 22" could result. The risk of such unsafe condition be cannot be tolerated and must be eliminated. To that effect, an N2-limiting override operates in parallel with the basic control system shown. Such overriding system is not shown, being well known in the art and playing only the role of a "safety valve". A signal representative of N2 is sent to the CPU where it is processed by comparison to a set value N2max. Whenever sensed-N2 values become equal to N2max, the CPU causes a signal to be sent to the control system portion that regulates fuel delivery (154) to combustor 70, which brings fuel flow Wf down to its engine idling rate. In engine configurations having only one turbine spool, N2 does not exist and such overriding feature is not required.

The nature and operation of typical fuel supply and metering/delivery systems are described and discussed in the cited references, thus system 154 needs no further elaboration. The same applies to ignition system 152 and for that reason, further description thereof is also omitted. Three-way by-pass valve 155 is a feature specific to the present engine. Rotor 158 actuated by rotatable shaft 155' cooperates with casing 159 having three openings, one for admission of compressed air at pressure P1 from compressor 21 output and two for directing this by-passed air either to turbine spool 22" inlet or the turbine exhaust pipe. The valve is normally closed and no air is bled off compressor 21. However, to prevent or accommodate compressor stall conditions during rapid engine accelerations, that valve is caused to open so as to by-pass compressed air as indicated above. Further discussion of that matter is presented in the next section.

Valves 47' and 55 are connected, i.e. interrupted link a—a, and operate conjunctively and cooperatively so as to allow compressed air to by-pass the combustor during some engine operation phases when free piston 71 is locked, e.g. certain rapid engine decelerations. If it were not for such provision, compressor 21 might be caused to stall momentarily because damper 40 is neither intended nor designed to store such large volumes of compressed air. It should be noted that by-pass valve 155 and the combination of valves 47' and 55 neither operate at the same time nor perform similar functions as readers skilled in the art will readily recognize.

The air-compressing system needed to additionally compress the already-compressed air for delivery to the air bearings supporting free piston 71 and/or the air-cushion double-bearing of the turbine shafts is not shown here, though previously described in reference to FIGS. 1 and 10. In FIG. 2, pneumatic potentiometer 157 is represented by the combination of variable orifice 59 and valve 61. Thus, signal lines 134 and 135, air ducts 124, 60 and 63 of FIGS. 2 and 10 are all shown in the simplified representation of FIG. 11 as single connections having more than one reference number. Connecting lines previously called out in FIGS. 1 and 10 for example are: line 117 to ignition system 152 (or 118), line 122 for control of the free piston air cushions on its guide tube 74, line 121 for control of the free piston air cushions in sleeve 72, signal line 131 for transmitting free-piston 71 position data to the CPU, signal line 123 from the CPU for control of the free-piston locking system and signal lines 132 and 133 from the CPU to valves 55 and 47'. Other signal lines and ducts not yet identified are: signal line 138 for control of by-pass valve 155, signal line 139 transmitting P1-values to the CPU, compressed air duct 140 to by-pass valve 155, by-passed-air duct 141 to inlet 141' to second-spool turbine 22", by-passed-air duct 142 to inlet 142' to the turbine exhaust pipe, signal line 143 connecting temperature sensor 150 to the CPU, signal line 144 connecting pressure sensor 151 to the CPU, signal line 145 connecting N-sensor 156 to the CPU and fuel line 146 for fuel delivery to combustor 70. The operation of by-pass valve 155 is self-explaining or obvious to those skilled in the art from its schematic representation, i.e. when actuated a fraction of a turn in arrow-f' direction from its normal closed position, it by-passes compressed air to the turbine exhaust, when actuated a fraction of a turn in arrow-f" direction from its normal closed position, it by-passes compressed air to the turbine inlet 141'.

The functions and operation of the CPU are described in the flow chart of FIG. 12. Only those functions which are performed to control the engine operating specifically as a gas turbine are illustrated therein. The free piston operation, the fuel injection and ignition timings, the control of the free piston air cushions and the starting of the engine are not shown. These are either state-of-the-art or described and discussed in references (3) and (5) in cases where the present combustor is coupled to vane motors. The algorithms and/or equations involved are very simple and are given and defined in the next section. The CPU comprises a set of input ports for receiving signal data, a set of output ports for sending signals representing commands, a memory bank in which performance and characteristic information regarding engine data is digitally stored and state-of-the-art means for accessing such data and retrieving it. A computer is programmed as is well known in the art for processing the retrieved data along with the inputed signal data. The computer generates the values to be given to outgoing signals sent through the output ports.

The digitalized data stored in the CPU memory is presented in graphic form by the curves of FIGS. 13 and 14. This information applies only to an engine of specific design and characteristics and it is plotted as a function of $N^*$ between idle and $N^*$max. In FIG. 13, the following engine operating parameters are shown in their dimensionless forms, whenever applicable:

$N^*$—engine regime or rpm
p—engine power shaft demand
$T6^*$—turbine inlet temperature
$Wa^*$—air mass-flow
$R^*$—air/fuel ratio
$P^{*'}$—damper control pressure
$P1^*$—compressor outlet pressure Stall—compressor stall region
"P1", "P1'" and "P1''"—reference operating points of the compressor/damper identified in the text
$N^*s$—engine regime at which stall is most critical
$N^*c$—engine regime at which engine operation is most efficient and referred to as "cruise regime"
Nv—variations of $N^*$ that correspond to the degree of air flow restriction imposed by the free-poston in the combustor
A—indication of the p value at which the engine should cruise
B—air mass flow passing through the engine at a cruise regime
C—local air mass flow characteristics at higher values of P1 at varying corresponding values of $N^*$, under dampler action
D—local air mass flow characteristics at lower values of P1 at varying corresponding values of $N^*$, under damper action.

In FIG. 14, the following engine operating parameters and characteristics are shown in their dimensionless form, as applicable: (Note: parameters already defined in FIG. 13 are omitted below)

$Wf^*$—engine fuel consumption as a function of engine regime $N^*$
Wsp—engine specific fuel consumption varying with $N^*$
$\Delta Wf^*$—engine fuel consumption difference between engine steady-state operation and engine maximum acceleration condition
$Wf^*$min—minimum engine fuel consumption during engine maximum deceleration conditions
R—air/fuel ratio variations with $N^*$ during a typical scheduled engine maximum acceleration from idle to Nmax
$Wf^{*\sim}$—maximum scheduled fuel flow delivery to the engine during engine maximum acceleration conditions (no stall present)
S—variations of $Wf^*$ with $N^*$ during a slow engine acceleration as performed manually and carefully by an engine operator
$T6^{\sim}$—acceptable peak transient variations of the turbine inlet temperature during engine acceleration as a function of $N^*$
$Wf^{*'\sim}$—maximum scheduled fuel flow delivery to the engine during engine maximum acceleration for avoiding the stall region
A'—engine fuel flow at most critical engine stall regime $N^*s$
A"—acceptable maximum fuel flow delivery at $N^*s$ during engine acceleration around the compressor stall region
A—point in scheduled maximum fuel flow curve beyond which compressor stall is no longer a problem
B—variations of $Wf^{*\sim}$ as a function of $N^*$ scheduled for preventing compressor stall from happening
C—actual variations of R as a function of $N^*$ at the start of an optimum engine acceleration from idle
D—actual variations of R as a function of $N^*$ at the end of an optimum engine acceleration to Nmax
E—variations of $Wf^{*\sim}$ at the end of an optimum engine acceleration after the $T6^{\sim}$ overriding control has taken over
F—portion of curve $Wf^{*\sim}$ that is superseded up to point A for preventing penetration in the compressor stall region
I—starting point of the R-curve that corresponds to a fully scheduled fuel control for an optimum engine acceleration
J—ending point of the R-curve that corresponds to a fully scheduled fuel control for an optimum engine acceleration
M—point indicating the minimum of specific fuel consumption or maximum engine efficiency at engine cruise regime $N^*c$.

The rationale and reasons for selecting those various parameters and their variations as a function of $N^*$ are presented in the next section. The ends of the various curves are clearly indicated for easy reference. The scales of the various parameters are not shown but extend between the two ends of each curve along a corresponding portion ordinate axis, appropriately labelled.

The various values plotted in the graphs of FIGS. 13 and 14 are entered in the CPU memory and stored there for the life of the engine, except for those of p, R, the various points identified for reference only, $N^*c$, $N^*s$, S, Wsp, curves C, D, F and Nv, T6max, "P1", "P1'" and "P1''", which refer only to end results obtained from the scheduled regulation of the fuel flow. Curve $P^{*\prime}$ does not correspond per se to engine control but indirectly affects its operation by affecting the compressor operation and is therefore handled as is compressor stall avoidance. The conjugate operations of values 47' and 55 are ignored here for reasons previously stated. In the flow chart of FIG. 12, their presence and use are mentioned indirectly by the functional call-out name of BY-PASS VALVES which includes by-pass valve 155 too.

In the flow chart, for simplification sake, fuel scheduling during engine decelerations is not mentioned, being so simple. The input parameters are: p or percentage of full power demanded by the driver 0 or idle position to 100%), Po atmospheric pressure varying from 15 psia to possibly half of that, To atmospheric temperature varying from 120° F. down to possibly −30° F. and expressed in absolute degrees in all equations, N expressed in rpm, P1 expressed in psia in all equations and P6 expressed in psia in all equations. $\pi$ was previously defined, $\tau$ is equal to To/T0, with T0 being the Standard Atmosphere Temperature at sea level or 59° F. The values of Po,To and N become corrected as described in the next section so that other parameters can be expressed in dimensionless forms in the first data processing step. Actual values of Wa, Wf, R and T6 are then calculated, using the data representing corresponding curves of FIGS. 13 and/or 14.

Because the following is state-of-the-art, it is not shown in the flow chart, but the rate of variation of p is continuously computed. If it is nil, Wf is computed to correspond to curve Wf of FIG. 14. If it is positive but lower than a given rate (e.g. 10%/second), Wf is computed to correspond to a curve such as S that is not known and variable but results from the engine slow acceleration as follows: Wf is increased gradually from its starting value at the same rate as p is increasing, N increases acordingly, Wa increases accordingly, R increases also accordingly and new steady-state values of Wf as a function of N are continuously being computed. These represent starting point values for the next iteration if p is kept increasing. Each iteration lasts a set duration, e.g. one tenth of a second. If the variation rate of p is negative and also lower than the given rate, a reverse process (Wf decreasing) takes place. If the variation rate of p is larger than that of the given rate above, the value of Wf is increased suddenly from that corresponding to point A' of FIG. 14 to that corresponding to point A''. The excess of fuel supply $\Delta Wf$ to the engine above the steady-state value causes the engine to accelerate at a rate as high as possible, though safe. As the engine rpm increases, a sequentially iterative process similar to that described above takes place, though the values of $Wf^*$ are calculated using equation $Wf^* = F(N^*)$ directly, as new transient values of N become available upon processing in a non-dimensional form. When the value of N corresponding to the new value of p selected by the driver is reached (FIGS. 13 and 14 graphs), the new power level wanted is reached. The steady-state value of Wf is calculated as was previously indicated above for a slow engine acceleration.

If the rate at which p is suddenly being reduced is much lower than that corresponding to a quick power cut-off, the amount of fuel flow Wf to the combustor is reduced accordingly at the same rate as p. This holds true until the relative reduction of Wf is such that corresponding values of $Wf^*$ and $N^*$ reach down to curve $Wf^*min$, in which case $Wf^*min$ limitation takes over the scheduling of minimum fuel flow as a function of N.

In an alternate embodiment of the control system, the three values of fuel flow, $Wf^*$, $Wf^{*\char`\^}$ and $Wf^*min$, are continuously computed for all values of N at which the engine is operating. Depending on the nature of the changes in p values, i.e. constant, positive or negative, the corresponding type of $\Delta Wf$ adjustment is selected. Identical iterative computations of Wa, R and Wf based on sensed actual values of N are carried out during each incremental time step of the transient adjustment of the engine to the change in p. The transient condition stops when $N^*$ reaches the value that the new set value of p demands. In this control method, the fuel delivery rate adjustments can be visualized as a series of step increases, e.g. in case of a slow engine acceleration, between two limits, up and down, as compared to the gradual adjustment that the first method described above yields. Such step variations of Wf could be objectionable in conventional gas turbine applications where continuous combustion takes place. However, in the present application where the combustion process is pulsative by nature, such possible objections appear unwarranted.

In order to prevent T6 from reaching dangerous values and so as to avoid using direct high-temperature sensing at the turbine inlet, an indirect method of scheduling T6 or T6max is preferred, as discussed in the next section. This method is exemplified by curve E of FIG. 14. To such effect, $Wf^{*\char`\^}$ is programmed to vary as scheduled in function of $N^*$ to operate as a limit that $Wf^*$ cannot exceed. This indirect approach to limiting T6 by means of a scheduled limitation of Wf as a function of N is represented in FIG. 12 flow chart by computation loop L shown in dotted line on the right side of the CPU block.

P1 and P6 are continuously sensed or measured. Their dimensionless values are also stored as a function of $N^*$. Computed values of P1 and P6 properly corrected by the factor $\alpha$ can then be compared to their measured values so as to: (1) establish a measure of the correctness of the engine operation, and (2) determine whether $P^{*\prime}$, during steady-state engine operations, varies as a function of N according to the programmed schedule $P^{*\prime}/\pi = f(N^*)$ as indicated in the graph of FIG. 13. The computations of the corresponding pressure ratios P1/Po,P6/Po and P6/P1 are used to determine more meaningful forms of expression for these two pressures and to eliminate the influence of ambient air pressure. Also, the conjugate operations of both values 47' and 55 can and should be permitted only when P1>P6, i.e. when the operation of the combustor is by-passed momentarily while the free piston is locked or operating at very low frequency, i.e. idle regime.

FIGS. 15 to 17 present a design variation of the double-piston arrangement of damper 40, shown partially and in details. Those parts previously identified in FIG. 2 and only modified have the same reference numbers. Only one piston (43) is shown. Piston 44 (not shown) is modified as is indicated below in the case of piston 43. The use of "stop-and-bounce" springs 160 and 161 enables both pistons to move freely until they contact their respective spring free ends such as 162 for spring 161. When such contact is established, the piston assembly becomes subjected to axial loads that slow down the piston assembly and causes it to bounce back in the opposite direction. Such action may be repeated at the end of each excursion of the piston assembly in either direction. As a result, the piston assembly: (1) becomes automatically centered between the two springs free ends, (2) is effected only when the piston excursions exceed a set travel distance, (3) may be subjected to unsymmetrical actions from the springs, (4) is enabled to receive rotative impulses as a result of such actions, (5) is affected only by pressures P1, P6 and P*' during most of its travel, and (6) becomes rid of two adverse effects, i.e. air/gas leakage and particulate dust intrusion or entrapment between the pistons and their respective sleeves, as the pistons slide in arrow f direction.

Stem 52 is replaced by stem 52' that has no groove 56 and is made hollow to save mass. Hole 57 is replaced by bore 57'. Flange 58 is provided with a plurality of holes 58' that offer no resistance to air flows along the directions shown by the two arrows. One end of each spring is secured by retaining features 163 and 164 that are fastened to flange 58. Each piston and cooperating free end of its corrresponding spring are equipped with matching annular teethed-tracks 165 and 166, respectively, which engage when a piston and its cooperating spring end come into contact. The local sectional view taken along section line 17—17 shown in FIG. 15 indicates how a symmetrically-inverted "ratchet-type" of intermittent engagement between the two tracks can be used in cooperation with an helical spring operation.

If one end of an helically-wound spring is fixed and its opposite end is free to rotate, that free end will automatically rotate about the spring centerline if the spring length is caused to vary under the action of axially-directed loads. In the present application, one spring end is fixed and the other is free to rotate because piston 43 (or 44) is free to so. Thus, whenever a piston makes contact with an associated spring end, as the piston moves to compress the spring, the spring imparts a slight rotational momentum to the piston. As the piston rebounces, some of the angular momentum causes the piston to rotate a few degrees relatively to the angular position it had when the piston first contacted the spring. When the piston makes contact again at the onset of the next spring compression, a proper combination of teeth 167 and 168 (or notches) angles $\alpha$ and $\beta$, of notch pitch $\lambda$ and of the spring characteristics causes the piston to automatically rotate in a preferential direction. Track 166 moving in the reciprocating direction of arrow f and caused to move laterally in arrow f' direction will result in a mean overall motion of track 165 in the direction of f", because of the assymmetry of the notches, in spite of the symmetry in spring loading and unloading.

FIG-16 drawing depicts two improvements in the piston design that eliminate or greatly reduce the drawbacks of fluid leakage and the concomitant introduction of particulates in the clearance gap existing between piston and sleeve. The amount of radial clearance $\epsilon$ can be increased when an annular seal such as 169 is located in groove 170 of piston 43 so as to leave an annular space 171 open to collect the few particulates that become trapped between the piston skirt outer surface and the sleeve inner surface. The piston skirt houses two types of smaller grooves, annular such as 172 and longitudinal such as 173. These two types of grooves cooperate first to trap the particulates and second to channel them into collecting space 171. Pressure P*' existing between the two pistons is always smaller than either one of the two pressures existing on the other sides of either pistons.

Seal 169 body is formed by two major sections: a flexible lip section 174 and a bead section 175. The whole seal is made of graphite reinforced with carbon-/graphite fabric arranged in multilayers so as to provide flexibility. Such a seal construction is described in reference 7 for a similar high-temperature application. The presence of seal 169, even when provided with a transversal slit to accommodate its installation in groove 170, greatly reduces the amount of fluid-flow leaks between P1 or P6 and P*', as compared to those that characterize the piston designs of FIGS. 1 and 2.

FIGS. 18 to 21 depict alternate configurations of gas turbine motors for which fuel combustion is "externally" performed. "Externally" refers to the following distinguishing features: (1) fuel combuation takes place in a combustor that is not structurally part of the motor structure, i.e. holding compressor and turbine together, (2) the compressed air flow out of the compressor and the combusted gas flow into the turbine are intermittently decoupled (pulsating), and (3) the admission of compressed air and the injection of fuel in the combustor are thus also enabled to pulsate. Especially in motor configurations that include two mechanically-independent turbine spools, the distinguishing features above facilitate the construction of geometrically-unconventional arrangements of compressor, turbine spools and shafts.

In FIG.-18 motor configuration, drive shaft 26 is located on the exhaust end of turbine spool 22" and traverses exhaust pipe 24. It is isolated from the exhaust gases by shielding duct 180. An element not yet introduced is thrust bearing 181 located at the other end of shaft 26 which is always cool. In FIG.-19 motor configuration, shafts 25 and 26 need not be concentric. Thrust bearing 181 could preferably include air pads, because of its location. In FIG.-20 motor configuration, second turbine spool 22" and exhaust pipe 24 are located between compressor 21 and first turbine spool 22'. Compressor 21 is driven by turbine 22 second spool 22" and first turbine spool 22' powers drive shaft 26. Two thrust bearings are provided, 181 between hollow shaft 182 and drive 25'. The total thrust developed by both shafts is transmitted to thrust bearing 183 and ultimately to motor structure 185. Air pad bearings 184 and 186 may support the right end of shaft 25' nside shaft 182. In FIG.-21 motor configuration, compressor 21 is also driven by the turbine second spool. However, drive shaft 26 powered by the first turbine spool is still driven by shaft 182 but by means of a right-angle drive connection so that drive shaft 26 emerges between compressor 21 and turbine 22 first spool 22', whilst the exhaust gases emerge at the motor end opposing the compressor inlet end. The exhaust gas flow and shaft 26 thus need not interfere. Readers skilled in the art will be able to evaluate the respective advantages and disadvantages of these various motor configurations in the context of both engine applications and flexibility of engine designs offered by the external positioning of the combustor.

DISCUSSION AND OPERATION

Although it could be argued that in conventional gas turbines fuel is burned externally to the air-compressing and gas-expanding members, the fuel-combustion member is a structural integral part of the engine. In conventional piston engines, the air-compressing, gas-expanding and fuel-combustion functions are performed in a commonly used structure. In conventional rotary engines, that same feature is also present. In the various EC engine embodiments described and discussed in the cited references, that distinctive feature is absent. The above-mentioned three functions are performed in separate and specifically allocated spaces of the engine structure, though some parts may have a dual role in the performance of two functions. In gas turbine engines, no single individual part participates to the performance of more than any one function, i.e. that for which it is specifically designed. This principle of operation imposes limits on the maximum levels that certain critical operating parameters are allowed to reach, e.g. peak temperatures of the gases around the turbine blades.

A second operation principle is derived from the necessity imposed on rotating machinery handling high-speed air or gas flows to operate with quasi-steadily continuously flowing fluids. This is the cause of another operating requirement: that the introduction of fuel also be quasi-steadily continuous. The compressed air in which the fuel is to be burned necessarily exits the compressor at high velocity and the combusted gas leaves the combustor also at high velocity so as to impel the turbine blades efficiently. But fuel combustion cannot occur or be sustained unless the velocity of the air is lower than the speed at which the flame can propagate. Both the slowing down of the compressed air and the accelerating of the combusted gas cannot be performed efficiently unless they both are achieved progressively. This requires some distance, as does the combustion process. The sum total of the distances through which the working fluid must flow thus does not decrease as the size of the engine when the maximum power rating of an engine of this type decreases.

A third basic operating principle applicable to gas turbines pertains to the well known fact that air compression and gas expansion both require high linear velocities of moving parts to create or to handle high-velocity flowing fluids. As the engine size is made smaller, the gyration radii of parts also become smaller. An obvious result is that the rotational speeds of those parts must be higher so as to still provide the high linear speeds needed.

These three principles characterizing the operation of gas turbines explain why firstly gas turbines could not be developed commercially until high-temperature materials became readily commercially available and secondly very small gas turbines for car propulsion are not yet practical. The day when this becomes possible is fast approaching, though, even for gas turbines with a maximum power range of 100-HP, for instance. One major technological development during the past ten years has contributed more than any other to this advancement: that of ceramics. Because the present availability of such materials in high-tolerance machined form is of prime importance for applications to gas turbines, and especially to the engine of the present invention, the pertinent capabilities and characteristics of most interest of three such ceramic materials are discussed below for later reference.

Such materials produced by KYOCERA are: (1) silicon nitride (SiN) SN-201 and SN-220, (2) silicon carbide (SiC) SC-211, and (3) alumina A-479. The relevant properties of interest here are: density, thermal expansion, thermal conductivity, flexural strength at elevated temperatures, Young's modulus of elasticity, the maximum temperature usage, the temperatures at which the flexural strength starts decreasing (Tc) and at which the material can be quenched in water at 20° C. (Tq) and still retain high flexural strength. The thermal and density properties are given in Table A below as ratioed to those of Ni-Mo stainless steel at 800° C., for easy comparison with materials used in high-temperature applications such as those discussed here.

TABLE A

| Some Typical Properties of Ceramic Materials | | | |
|---|---|---|---|
| Property | SiN | SiC | Alumina A-479 |
| Density (SN-201) | 0.366 | 0.403 | 0.49 |
| Max. Temp. Use (SN-220) | 1,200° C. | 1,200° C. | 1,600° C. |
| Young Modulus (SN-220) | 43,000 psi | 62,000 psi | 50,000 psi |
| Flex. Strength (SN-220) | 85,000 psi @ 940° C. | 78,000 psi @ 650° C. | 41,000 psi @ 900° C. |
| | 80,000 psi @ 1000° C. | 68,000 psi @ 1000° C. | 32,000 psi @ 1000° C. |
| | 63,000 psi @ 1,130° C. | 63,000 psi @ 1,130° C. | |
| Thermal Expansion (SN-201) | 0.167 | 0.275 | 0.525 |
| Thermal Conductivity (SN-220) | 0.5 | 1.4 | 0.185 |
| Quenching Temp. (SN-220) | 570° C. | 415° C. | 200° C. |
| Flexural Strength after quenching | (SN-220) 86,000 psi | (SC-211) 80,000 psi | 43,000 psi |

Two other characteristics of interest here are brittleness and creep at elevated temperatures. Ceramics are brittle by nature and this is an area in which considerable efforts are being made to improve the present situation. Although no creep data is available, it would appear that it should be nil or small, on account of the crystalline structure of ceramics. Minimum creep is important for turbine blade applications.

Dimensional accuracy and/or production tolerances and fabricability of complex-shape parts are also important. Upon firing, part surfaces can be ground, lapped and/or polished to satisfactory degrees of surface finish. Porosity can be sealed by metallization with molybenum-manganese, especially if ceramic parts are to be joined to metal parts. Brazing with metallic parts is performed after first plating the metallized ceramic part with nickel. The brazing material must have thermal expansion properties equivalent to those of the ceramic. Kovar, a nickel-cobalt-iron composite, can be used. The Mo-Mn layer partially diffuses into the ceramic base material and forms an integral part of the ceramic body. The precision or machining tolerances available are of the order of half-a-thousandth of an inch (0.0005 in.) and well within the dimensional requirements discussed later.

In the present invention application, such ceramic materials can most advantageously be used in the turbine (blades and lands of the air-cushion bearings), the combustor member (free piston body and air-cushion lands, guiding tube 74, edges of the outlet valving means, rollers and associated grooves used for imparting its rotational oscillations to the free piston, etc. . . ) and the storage/heat-exchanger member. For instance, silicon carbide SC-211 seems to be an ideal material for the internal components located on the right side of FIG.-2 member 40, because of its high thermal conductivity. Silicon nitride SN-220 appears ideally suitable as turbine blade material because of the very high flexural strength it retains up to 940° C. SN-220 also exhibits the highest heat shock resistance. Such high-temperature operating levels indicate that maximum temperatures of the combusted gas in the combustor, in the heat exchanger and around the turbine blades open up possibilities that otherwise would be unthinkable. These possibilities should now be discussed.

Optimization of a Gas-Turbine/Free-Piston EC Engine

The operation mode of this type of engine must first be discussed, in the context of the description given in the previous section in which the diagrams of FIGS. 3 to 5 are explained in a general way. Generally speaking, the P-V diagram is used to give an indication of the work produced by an engine operating according to a given thermodynamic cycle type. Specific T-S (temperature/entropy) and enthalpy diagrams, for given combinations of working fluids and fuels, are used for computing directly thermodynamic cycle efficiencies. The object here is not to calculate and compare efficiencies numerically but only to discuss the optimization of the cycle efficiency of a gas-turbine/free-pistoncombustor combination in an EC engine. Such a discussion is particularly pertinent here because the maximum constant temperature at which combusted gas can be admitted into a turbine is much more critical than it is in the case of other types of gas expansion members as described in the cited references. FIG. 3 P-V diagram is most suitable for such a qualitative discussion.

A general statement applicable to the compression of all compressible fluids is that less work is needed to compress a given weight of fluid if its temperature is kept as low as possible. A direct illustration of this is the inter-stage cooling of the air being compressed in a multi-stage compressor. In the present engine case, some air is compressed in two stages in series: by compressor 21 and then indirectly by the free-piston in combustor 70, as discussed below. However, a more important loss occurs because the combustion chambers do not fill up as efficiently as they would if the compressed air were at a lower temperature, i.e. without the effects of the pre-heating step in heat exchanger 40. Thus, a question arises: why and how might it be more efficient to heat up the air already compressed by compressor 21 than to admit it directly in combustor 70, though it might have to pass through storage tank 40, but without being heated? A multi-part answer is: (1) the object here is not to compress air for delivery and storage at ambient temperature, (2) the temperature rise of the compressed air corresponds to a concomitant lowering of the temperature of the combusted gas before its admission to the turbine, (3) the enthalpy transferred from the combusted gas to the compressed air, for a given fixed peak temperature that the combusted gas can reach at the turbine inlet, hence at the end of the combustion process, corresponds to a fuel saving, (4) the lowering of the turbine inlet temperature allows a concomitant increase of both temperature T4 and pressure P4, for an imposed fixed maximum operating temperature of the turbine blades, and results in an efficiency improvement, and (5) a net energy loss results nevertheless from the fact that the compressed air valving means operates less efficiently when compressed air is less dense (hotter). Thus, what is the total net energy loss (or gain) that results from the combination of all these conflicting factors? How can such gain, if any, be maximized?

Analytical derivations and calculations of such thermodynamic processes are beyond this disclosure scope, however, FIGS. 3–5 diagrams may be used to discuss them qualitatively. In the P-V diagram, the energy corresponding to area 1 (or A)-B-4-3-2-1 represents a loss caused by the increase in the compressed air specific volume due to heating in the heat exchanger. Point 3 corresponds to an intermediate stage where some fuel has burned and some compressed air has been further compressed. The specific volume of that air is then at its minimum (maximum overall compression achieved during the cycle). Segment 3-4 corresponds to the pressure increase resulting from the fuel combustion final stage (explosion-like as in an OTTO Cycle). Segment 4-5 corresponds to the partial expansion of the combusted gas which takes place in the combustor to provide further compressing of the remaining compressed air as previously mentioned. Segment 5-6 corresponds to the enthalpy loss that occurs in heat-exchanger 40. Segment 6-7 corresponds to the combusted gas expansion in the turbine. Area 5-6-7-5 thus represents a loss. Assuming that peak pressure P4 reached at the end of the fuel combustion corresponds to point 4, when the combustor outlet valving means opens.

For qualitative comparison purpose, an OTTO Cycle is illustrated by dotted lines 0-A-C-E-0. Its peak pressure is shown to be higher than P4.A Brayton (Joule) Cycle representing a gas turbine operation looks like 0-A-D-7-0, if its compression ratio is assumed equal to that of turbine 20 of FIG. 1. Thermodynamicists will show how a Diesel Cycle would look (0-F-G-H) and can realistically reconstruct all such cycles with comparable assumptions: (1) compression ratio, (2) maximum pressure, (3) maximum temperature, etc., each peak parameter value representing the limiting factor typical of the engine cycle used for comparison.

Corresponding significant points and curve segments are indicated in the T-S and P-T diagrams of FIGS. 4 and 5. FIG. 5 diagram only shows a David-III-Cycle for easy identification of various corresponding temperatures and pressures. Significant temperature changes are: (1) T2-T1 (compressed air heating in heat exchanger 40), (2) T5-T6 (combusted gas cooling in heat exchanger 40), (3) T4-T5 (combusted gas cooling as its pressure decreases from P4 peaks to mean operating value P5 as the combusted gas leaves the combustor) caused by the gas polytropic expansion.

A basis for the optimization of the engine of the present invention may now be established. A first fixed constraint is the maximum temperature that the turbine blades can withstand indefinitely at the maximum value of N1 of FIG. 10, referred to as T6. A second temperature constraint is imposed by the maximum value T5 that the most highly thermally-stressed internal parts of the heat exchanger can withstand, again indefinitely. Temperature T4 is less critical, because the internal parts of combustor 70 are alternatively exposed to compressed air and combusted gas, as is the case in piston engines. Engine operational parameters available for adjustment are: (1) the peak pressure P4 which the combustor must withstand, (2) the overall maximum compression ratio $r_m$, i.e $P4/P0$, of which the engine is capable, (3) the relative amount of air compression that combustor 70 yields is $r_s = \rho/r$ if $\rho = P6/P0$, whilst r represents the mean compression ratio of which compressor 21 is capable, and (4) the amount of heat exchanged between compressed air and combusted gas, measured by (T1-T2) or a related value of (T5-T6) differing only by a constant k, which can be expressed as a ratio of the temperature increase (T4-T3) caused by the fuel combustion; at the maximum power setting of the engine. The object of the optimization is to determine a set of maximum values of these parameters which corresponds to a minimum specific fuel consumption for an engine operation point at which the engine is assumed to operate most of the time. This aspect of engine design is well known and understood by engine designers, thus needs no further justification or elaboration.

A parametric design study of this type of engine will then establish a set of corresponding optimum values, one for each of the four parameters defined above. Such a set of design-point values is based on an engine operating regime, i.e. percentage of maximum power rating at set values of N1 and N2, such that minimum specific fuel consumption by the engine is obtained at this operating point. This set of design values for the design parameters then fixes an engine basic design in which maximum values of these parameters may then be singularly and unequivocally determined. After several iterative design parameter adjustments, a set of consistent values of those parameters at both operating points, i.e. design and maximum power setting, can finally be defined. The constraints of T6 and T5, and of P4 maximum allowable limits are thus respected, whilst the engine will operate at its maximum efficiency point most of the time, and below such limits.

In the course of the parametric design study, various values are tried in combination for: P4, $r_m$, $\rho$, r, (T1-T2)/(T4-T3), and possibly T5. For each combination above, a thermodynamic efficiency can be calculated. Maximum values thereof can then be determined. A peak value of all these maximum efficiency values can finally be determined. Corresponding optimum values of the above parameters become concomitantly defined, they are associated with the combination of parameter values which yielded that peak value of the thermodynamic efficiency.

The design of critical engine components, their characteristics and performance must now be established, first by means of analytical design work and then experimentally. Such components are: (1) the combustor automatic valving means, especially that of the compessed air admission, (2) the internal heat-exchanging means located in member 40, (3) the dynamic characteristics of piston-43/stem-52/piston-44 assembly, relatively to that of free piston 71, (4) compressor-21 flow characteristics, i.e. variation of air mass-flow and concomitant variation of P1/P0 at quasi-constant value of N1 below the compressor stall region, and (5) the pressure drops incurred in member 40 and various connecting air and gas ducts. The engine operation during one steady-state cycle should now be analyzed and discussed.

Engine Steady-State Operation

Referring to cited references (1) and (5) is suggested at this juncture. The following pertinent points are of particular interest here: (1) compressed air in the combustor cannot be further compressed by means of the combusted gas present on the other side of the free piston in the other combustion chamber, but only upon combustion of the fuel just injected in that compressed-air slug by the newly formed combusted gas therein, (2) the combusted gas present in the other combustion chamber can be further compressed by this newly formed combusted gas by means of the free piston, (3) this interaction between the combusted gas contained simultaneously in both combustion chambers is always present and of course required, though to various degrees, (4) the degree of such interaction determines the ratio P4/P3 and to what extent the engine operates comparatively to an OTTO Cycle (DAVID-I) or a Diesel Cycle (DAVID-II), and (5) to a degree, the compressed air inlet valving means timing, hence dimensioning, but more importantly, the fuel injection and ignition durations and timings determine the combustor cycle operating mode. The type and amount of fuel injected are at the discretion of engine users/operators.

Two major distinctive differences exist between the engines described in the cited references and that of this invention: (1) air compression here is accomplished by non-volumetric displacement means that are much more sensitive to air flow characteristics than are vane and rotary motors, and (2) such sensitivity can neither be ignored nor handled by a small constant-volume air storage tank. The air flow delivered by compressor 21 is continuous and that compressed air flow is admitted into the combustor in a pulsating manner. By comparison, turbo-chargers used in conjunction with piston engines would have to face the same difficulty, were it not for two factors: (1) the pulsation frequency is much higher there for each piston, and (2) several pistons are used simultaneously, which further increases the pulsating frequency of the compressed air flow demand. The turbo-EC-engine of the present invention is faced with a unique problem which can be defined as follows: how can the continuousness requirement of an air flow be made satisfactorily compatible with the pulsative nature of that same air flow downstream? Two basic approaches are theoretically available: (1) using a one-way aerodynamic valve between the compressor outlet and the storage tank, (2) using a pulsation-dampening mechanism that reduces the pulsation amplitudes down to levels acceptable to the compressor.

The first approach involves a sonic throat located between the compressor outlet and the storage tank. As long as the pressure ratio across the throat remains higher than roughly two, pulsating pressure variations donwstream of the throat cannot be transmitted upstream of the throat restriction. This is of course utterly impractical here for obvious reasons. The second approach requires the presence of a variable volume located between the compressor outlet and the pulsation cause. This is the design solution shown in FIGS. 1, 2 and 10. The manner in which pulsation dampening occurs and the requirements therefor may now be discussed, in the context of the compressor operating constraints.

Such contraints, referred to as stall generically, stem from the need for steady air flows next to or about the flow channelling surfaces of the compressor. These surfaces are shaped like airfoils in the case of axial compressors and are continuous in the case of centrifugal compressors. Detachments of the air flow from airfoils causes stall and from continuous surfaces causes air circulation between guiding surfaces commonly referred to as surging. Because modern small compressors incorporate features common to axial and centrifugal compressors, both phenomena are hereinafter called stall, or stalling. When such compressors are driven at a quasi-constant rpm value, for instance N1 here, both the air mass flow and the outlet pressure or compression ratio vary as a function of each other if the compressor outlet is choked or throttled. The compressor efficiency increases concurrently as does the lifting capability of an airfoil for similar reasons. However, beyond a set limit, as an airplane wing stalls if its angle of attack increases above a certain value, stalling also happens at some location within the compressor. There is such a limit point for each regime or rpm of the compressor. The locus of such points defines the stall region into which an operating point of the compressor should not be not allowed to enter, lest disastrous consequences ensue, such as rupture of rotating parts. Within the most critical rpm range of any compressor, each characteristic iso-rpm curve exhibits two points: one corresponding to safe steady-state operation and the other corresponding to incipient stall. If P1 is the outlet pressure corresponding to the operation point and if P1' is the outlet pressure at which incipient stall occurs, the ratio P1'/P1 defines the amount by which the compressor can safely be choked or throttled. That pressure P1' or the ratio P1'/P1 determines here the degree and the manner by which a pulsating air flow delivery is acceptable. Incidentally, such choking effects occur all the time in the normal operation of gas turbines when fuel flow delivery rates are suddenly increased concomitantly with demands in power increases, for example. A major difference here is that choking occurs continuously at higher frequencies, yet with similar effects.

The requirements to be met to insure the satisfactory operation of compressor 21 may now be defined for any given compressor characterized by an outlet pressure P1 at N1 rpm. One may safely assume that P1 represents the mean value of the compressor outlet pressure varying between P1' and P1", with P1-P1"=P1'-P1. For a given pulsating frequency of the compressed air admission into combustor 70, a given compressor 21 and associated set of air-flow/outlet-pressure characteristics, readers familiar with the art will know how to determine the volume variations of storage tank 40 that are required to accommodate the pulsating nature of P3, while maintaining the variations of P1 within the limits P1" and P1' (stalling boundary). The pulsating frequency of combustor 70 is set by design and dictated only from considerations of weight and volume. The importance of these two parameters is compounded by the fact that the volume and weight of member 70 free piston are directly related and determined by two basic considerations of most importance: (1) the choice of fuel type to be burned which establishes the minimum fuel combustion duration yielding complete fuel combustion, and (2) the maximum of peak pressure P4 that the combustor must withstand. The first consideration sets both values of cycle duration, hence the free-piston maximum frequency of oscillation, and piston-displaced volume for a given maximum power rating of the engine. The second consideration influences the piston-displaced volume also and affects the free piston stuctural strength, hence its weight. The mean pressure differentials across the free piston are of the order of those existing across pistons 43 and 44. The effective diameters of free piston 71 and of pistons 43 and 44 are not very different, as a rough approximation. It may be assumed that the mass of the pistons-43-44/stem-52 assembly could realistically be made between five to ten times lighter than that of free piston 71. The oscillating frequency of the piston assembly of member 40 will at least be five times higher than that of free piston 71. With such a frequency ratio, it can be safely assumed that member-40 piston assembly oscillating motion can follow that of the piston with a minimum time lag.

In addition, during each full cycle, the free piston causes two combustion chambers to fill up with compressed air, but only partially. Thus, as a first approximation, the volume of compressed air admitted in the combustor is possibly one fourth of the volume displaced by one free-piston stroke. Considering the small time lag earlier mentioned, the volume displaced by piston 43 is slightly lower, depending on the maximum safe value that the ratio (P1'-P1")/P1 can reach without causing compressor stall. For the purpose of this disclosure, it will be assumed that the dimensional proportions between members 40 and 70 shown in FIG. 1 represent a realistic indication of the relative size of these two engine members. The influence and importance of adjustable air pressure P*' existing between pistons 43 and 44 are discussed later and can be ignored for the time being.

With the construction provisions defined above, the engine operates as follows during each free piston cycle and steady gas turbine member operation. It is assumed that a regulated set value of P*' is continuously maintained and that the free piston is at one end of one of its two strokes. Both inlet valving means are closed. Compressor 21 delivers compressed air at a pressure between P1 and P1' and piston 43 is moving toward the right end of its stroke, thereby enabling the volume of stored compressed air to increase. Before 43 reaches that stroke end and before the dangerous pressure limit P' is reached, one inlet valving means of the combustor opens. Compressed air is admitted in the corresponding combustion chamber at a flow rate much higher than that of compressor 21 delivery. Pressure P1 drops and piston 43 starts moving to the left under the combined influences of P*' and P6. The volume of heated stored compressed air decreases and the pressure in that volume reaches a value between P1 and P". Before piston 43 reaches the end of its reverse stroke, the inlet valving means of that combustion chamber closes and the cycle of: pressure P1 increase, piston-43 travel to the right and the concurrent compressed-air storage-volume increase; repeats itself until the free piston reaches the end of that combustion stroke, at which time another free-piston stroke starts. Piston 43 then repeats an identical full cycle while free piston 71 proceeds with the formation of a second combustion chamber, the opening of the corresponding inlet valving means and admission of hot compressed air, and the closing of the inlet valving means. Thus, two full cycles of piston 43 occur during one full cycle, i.e. two strokes, of the free piston.

Figure 6:
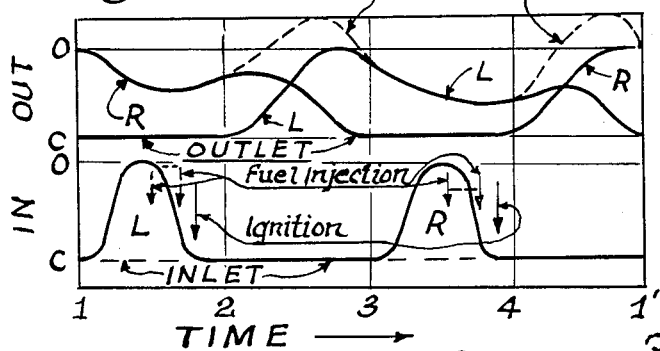
FIG. 6 is a timing diagram indicating how the closings and openings of the combustor automatic valving system are synchronized during one full double stroke of the free piston.

For a given engine power setting, under steady-state operating conditions, pressure P* is adjusted to maintain a constant level. However, combusted gas pressure P5 varies continuously during each stroke of the free piston for two main reasons: (1) as shown in FIG. 6, the opening of the outlet valving means varies continuously, and (2) the pressure of the combusted gas in each combustion chamber varies continuously under the combined influences of the combustion processes and the free piston axial displacements. As indicated in FIG. 6, the total opening of the outlet valving means occurs while the inlet valving means are both closed, i.e. when piston 43 is moving to the right and concomitantly causing the volume of stored combusted gas in member 40 to decrease. This causes pressure P6 to increase, because the restricting orifice area formed by the turbine inlet does not change. Both pressure P6 and the combusted gas flow rate must vary cooperatively to meet the gas flow requirements of the turbine.

The end result is that pressure P6 increases slightly whilst pressure P1 also increases, as earlier mentioned. As a rough approximation, the ratio P6/P1 will have a tendency to vary to a lesser degree than does either pressure individually. As discussed below, a mean value of P6/P1 is fixed by the area ratio defined by piston-43 and piston-44 areas. Pressure P*' is adjustable to render pressure ratio P6/P1 adjustable also. Under static conditions, the balance of the forces exerted by pressures P1, P*' and P6 on pistons 43 and 44 necessitates that A1(P1-P*) equals A2(P6-P*'), if A1 and A2 are the effective areas of pistons 43 and 44, respectively, ignoring friction and/or spring effects (e.g. use of bellows 66). Replacing A1/A2 by a and writing P6/P1=p* in the relationship above yields: $P*' = P1(p*-a)/(1-a)$ (1).

Obviously, P*' must remain smaller than P1 and cannot become realistically much smaller than P0 even if a compressed air jet pump is used to suck air from the space located between the two pistons. Because a>1 and P*' cannot become negative, equation (1) indicates the p* must remain smaller than a, which can easily be the case for the engine regimes of interest. For instance, if a=3 as is approximately the case in FIG. 2, values of P*'/P1 as a function of p· are shown in Table B below, along with the a=2 case.

TABLE B

| P*"/P1 variations as a function of P6/P1 | | | | | | | | | | |
|---|---|---|---|---|---|---|---|---|---|---|
| | a = 3 | | | | | a = 2 | | | | |
| P6/P1,p· = | 2.5 | 2.6 | 2.7 | 2.8 | 2.9 | 1.2 1.3 1.4 1.5 1.6 1.7 | | | | |
| P*/P1 = | 1.0 | 0.8 | 0.6 | 0.4 | 0.2 | 0.8 0.7 0.6 0.5 0.4 0.3 | | | | |

"a" represents a design parameter that becomes invariable for a given design of member 40. "p·" represents an engine design parameter that depends on two factors, the engine cycle adopted or value of P4/P1 and the engine regime (rpm). The former is fixed, the latter is variable within limits (e.g. amount of fuel burned) between idle and maximum power settings. A first conclusion can be drawn from the results of Table B: values of a between 2 and 3 cover the range of p and P*'/P1 values practical and obtainable. A second conclusion is that smaller values of a enable P6/P1 to vary between a much larger range of relative values of p, thereby allowing a wider applicability range. A third conclusion is that lower values of p· are impossible to obtain with higher values of a. Thus a compromise must be reached whereby a value of a yields an acceptable and workable variation range for P6/P1. The reader must be made aware that the engine operation mandates higher values of P1/P0 when P6/P1 reaches higher values (higher rpm) for any given engine design, during steady-state operation.

Between "cruise" (i.e. peak thermodynamic efficiency) and maximum engine power settings, maximum values of P6/P1 between 2.0 and 2.5 seem readily achievable. That means that the turbine inlet mean pressure can be more than double that of the compressor outlet pressure, representing the equivalent of an extra 2/1 compression ratio from pressure P1, referred to as $r_s$. Thus, the compressor of the gas turbine of the present engine needs only have half the compression ratio of a conventional gas turbine compressor, if the combusted gas overall expansion ratio ρ in the turbine is the same in both instances. The combusted gas expansion ratio from the peak pressure P4 reached at the end of the combustion down to the turbine inlet pressure P6 is then $r_m/\rho$. All of these ratios correspond to steady-state mean pressure values and neither to fluctuating values nor to transient values during engine accelerations or decelerations. Those are discussed next in the treatment of engine transient operation presented below.

Engine Transient Operation

Transient type of engine operations occur when either a power level increase is asked of the engine or a power level decrease is needed. The response of the present engine to adjustments in power output levels differs from that of conventional gas turbines, because of the presence of member 40 and of combustor 70. A distinction must be made between power augmentation and power reduction, because of the compressor behavior in general and on account of the pulsating nature of the combustion in particular.

All axial and centrifugal compressors are sensitive to stall. This condition develops if and when the increase in fuel delivery rate to the combustion chamber(s) is suddenly increased, which causes pressure P1 to increase beyond limit P' earlier defined. Another effect is an excessive increase in turbine inlet temperature, which may cause thermal shock in turbine blades. If the delivery rate of fuel is reduced suddenly below a critical limit, the combustion conditions in a continuous-flow combustion chamber are altered to the point where fuel combustion stops. A condition known as flame-out occurs, fuel must be re-ignited to relight the fuel. The control of the fuel rate delivery to the present engine is discussed later. The response of the engine discussed below is divided according to the two basic modes of transient behavior outlined above: (1) acceleration, and (2) deceleration. Each mode corresponds to a substantial variation of rotational speed (rpm) of the compressor-turbine assembly caused by sudden and substantial changes in either fuel delvery rates or torque applied on the drive shaft, regardless of the cause thereof and of the turbine configuration, i.e. single of double spool.

Engine Acceleration

This condition corresponds to a rapid increase in rpm of the compressor-turbine assembly in response to a brusque need of power level augmentation which results from a concomitant brusque increase in fuel delivery rate into the combustor. In the present engine, this transient situation develops as follows: (1) the delivery of fuel amounts in each combustion chamber is suddenly increased, without fear of overheating combustor parts, (2) the free piston instantly responds by increasing its peak linear velocity under the action of the concomitantly-raised combusted gas pressure, (3) the free piston cycling frequency instantly rises, (4) the frequency of air admission valving means opening suddenly increases correspondingly, (5) the delivery rate of compressed air from member 40 also instantly increases, (6) the cycling frequency of piston 43 rises correspondingly, and (7) the delivery rate of compressed air from compressor 21 to member 40 is enabled to follow suit immediately without causing P1 to reach limit P1'. A concomitant increase in delivery rate of combusted gas to the inlet of the turbine ensues concurrently with rises in combusted gas temperature T6 and pressure P6. The torque developed by the turbine increases and its rpm also increases. The engine accelerates, causing compressor 21 to raise its compression ratio and the drive shaft to deliver more torque.

The process described above is in a general way very similar to that taking place in a conventional gas turbine, except for a small time lag introduced by the free-piston response delay. This delay is much smaller than the response time of the rotating assembly of compressor-and-turbine. Its influence on the dynamic response of that assembly can practically be neglected. Thus, as a rough approximation, during engine acceleration periods, the transient behavior of the compressor-turbine assembly is comparable to that of a conventional gas turbine. The limiting acceleration parameters will be the maximum inlet temperature that the turbine blades can withstand during short-lived bursts, and the peak value of P1 that compressor 21 may withstand stall-free at any given rpm critical value, from a stall consideration.

It is noteworthy to mention here that the presence of member 40 and of its pressure surge-dampening effect may attenuate and/or delay incipient stall. Further, the decoupling of the combustion process from compressor 21 output will prevent resonant conditions to occur between compressed-air flow fluctuations caused by compressor stall and continuous combustion possible instabilities. It is believed that the overall influences of the presence of the free-piston combustor and its associated variable-volume compressed-air storage (or surge) member may result in a tangible benefit. In the worst case, it is safe to assume that compressor stalling will not be rendered more critical.

Engine Deceleration

This condition corresponds to a rapid decrease in rpm of the compressor-turbine assembly in response to a rapid lowering of power level that may result from either a brusque drop in fuel delivery rate or a rapid increase in drive shaft output torque. The latter should not usually occur because an increase in fuel delivery rate normally happens concurrently. However, a brusque drop in fuel delivery rate commonly occurs in ground transportation applications, e.g. from maximum setting to idle setting immediately, i.e. emergency stop. It is well known in the art that flame-out will occur in most gas turbines under such conditions, unless adequate measures are taken, e.g. built-in time delay in the fuel supply system response to power demand adjustments downwardly. It is of interest to discuss the effects that the pulsating combustion system of the present engine has on the response mode of an otherwise conventional gas turbine.

Again, it is assumed that the present engine is operating at full power setting. The engine rpm and the free-piston cycling frequency are at their maxima. The fuel delivery rate to either combustion chamber is cut down to its minimum idle setting. Immediately, the amount of fuel injected in each chamber is down to its set minimum value. Regardless of how small this fuel amount is, in the worst case where a full maximum amount of compressed air has already been admitted, that fuel will burn on account of the high-energy spark plug ignition provided for every cycle of the free piston, but it will only generate a very small amount of energy. The free piston will not receive enough energy from the burning of the fuel to continue its travel at the same speed and will decelerate because of the presence of combusted gas at pressure P6 possibly higher than the much-diminished value of P4 existing on the free piston side exposed to the combusted gas generated by that idle-setting fuel combustion.

Either one of two conditions results: (1) the free piston is prevented from reaching the end of that stroke and will stop inbetween the stroke ends (worst case), and (2) the free piston is able to reach the end of that stroke and rebounces back to start the next stroke (preferable case). In the second case, the free-piston cycling frequency had adjusted within one-stroke time. In the first case, one might say that combustion has stopped completely, although such condition cannot be compared to that of the flame-out of a conventional gas turbine. Reference (5) describes and discusses in detail such condition of routinely stopping and restarting the free piston operation. As temporal reference, it is noteworthy to indicate that at maximum power rating, the free piston cycling frequency is less than 100 cps and possibly down to 10 cps at idle setting, when the air mass flow through the engine may be less than one tenth the value corresponding to full power setting. This yields a ratio appreciably higher than 100/1 between full and idle power settings, because engine efficiency may be half at idling of that which is attainable at full power. The above full power frequency indicates that a few free-piston cycles can easily be skipped, during transient engine operating conditions, without affecting the motor dynamic behavior. Readers familiar with the art will also know that time delays of up to one tenth of a second are hardly noticeable in the vehicle response but can easily be incorporated in fuel delivery flow change rates in response to step input change in power level demand.

Yet, such time delay would be of no help in conventional gas turbines for preventing flame-outs, because the response time of even small gas turbines is much slower. However, one tenth of a second, at high power settings in the case of the present engine represents some twenty strokes of the free piston, thus ample time for performing the free-piston repositioning, locking and restarting steps described in reference (5). During the locking phase of the free piston, no combusted gas is delivered to the turbine although the compressor-turbine assembly keeps rotating at high rpm values, though decreasing fast because the turbine produces little or no torque. It may be desirable either to conserve the kinetic energy stored in the rotating mass of that assembly, i.e. case of momentary vehicle stops, or to increase the slowing down rate of that rotating asembly, i.e. case of engine shut down. In the former case, a first by-pass valve may be used to directly duct the compressed air flow from the compressor outlet to the turbine inlet. The rotating assembly is so enabled to free-wheel with a minimum energy loss, and will conserve its kinetic energy longer. In the latter case, a second by-pass or dump-valve may allow the compressor output air flow to be discharged directly into the turbine exhaust pipe through a nozzle that simulate the turbine inlet restriction. The compressor is thus forced to use the rotating assembly kinetic energy to compress the discharged air flow. This produces an effect similar to that of piston engine braking commonly used by drivers to minimize brakes wear. Readers familiar with the art will recognize the impracticality of attempting to stored compressed air instead of discharging it back to the atmosphere. The operations of the by-pass valve and/or the dump-valve are discussed later under the heading Engine Control System in the context of engine control generalities.

Damper/Heat-Exchanger/Storage-Tank

The above discussion indicates that member 40 plays a vital role in the operation of the engine of the present invention. It essentially enables the aerodynamic coupling of two compressible fluid flows to accommodate and to combine the idiosynchrasies of two dissimilar types of flow (continuous and pulsating) in a manner such that their characteristics are rendered compatible with the operational requirements of the compressor and the combustor. Pulsating combustion generated by pulsating fuel injection could also be performed in a manner such that the compressed-air flow delivery by the compressor is maintained under constant pressure. The combustion pulsating frequency can be made such that concomitant variations of P1 occur at the same frequency, though high enough and of small enough amplitude, so that the compressor operation is not adversely affected. In such instance, a resonating cavity may be used to dampen the rapid air pressure fluctuations. Such pulsating combustion process does not require the use of a damper of the type described herein, which is not capable of responding rapidly enough. The above mention is made to distinguish between pulsating combustion and pulsating compressed-air flow that requires pulsating fuel delivery, hence pulsating combustion.

Another basic difference worth noting at this juncture, is a generic characteristic of the present invention embodiment: that of enabling the mean pressure of the combusted-gas flow to be appreciably different from that of the compressed-air flow, mostly and generally much higher. No direct air-gas flow coupling is allowed in that embodiment, the combustor acting as a one-way valve. Member 40 represents a "flexible" part of such one-way valve and is mounted in parallel with it. That flexible part provides the fluid-pressure dampening function required but introduces a perturbation in the fluid flows themselves. It was earlier assumed for momentary convenience that piston-43/piston-44 assembly responds to the solicitations of only three pressures, two fluctuating (P1 and P6) and one adjustable to a set constant level (P*). Two factors combine to affect the set value of P*, they are: (1) P1-air and P6-gas leaks into P*-air cavity, and (2) the need for means to maintain that assembly centered between structure stops.

The first factor can be eliminated by using bellows such as 66 to isolate P1- and P6-cavities from P*'-cavity. Two problems are created thereby: (1) bellows act as springs and introduce a spring-rate effect that affects P1 and/or P6, and (2) a bellows sealing P*'-cavity from P6-cavity must operate at high temperatures. However, the elimination of the first factor, be it by means of only one set of bellows (i.e. 66), provides the means for satisfying factor (2) need, at the cost of leaving one leak problem unsolved, i.e. only partial elimination of factor (1). Thus, regardless of the nature of the most appropriate design solution selected, either the instantaneous value of P*' will vary about a mean adjusted value or the spring rate of bellows will create a side effect that will affect P1 and P6 as would instantaneous variations of P*' caused by leaks.

Readers familiar with the art will recognize that the magnitude of these P*' variations must and can remain small in comparison to the adjusted set value of P*'. They must because they are directly influential in determining the range P''-P' within which P1 must remain. They can because they only depend on the degree of sliding friction between pistons 43 and 44 and their respective sleeves, and on the mass of the pistons-stem assembly. This was previously discussed when the frequency response of that assembly was qualitatively evaluated. It is believed that proper contour designing of grooves 56, 64 and 65, in comparison with the flow characteristics of adjustable restricting orifice 59 and of valve 61 will satisfy the P*'-variation requirement just stated. It should be stated that effective areas of bellows equal to those of equivalent pistons require diameters larger than the diameters of such equivalent pistons. The value of a in equation (1) is of course based on ratios of effective areas, be they applied to pistons or bellows.

It should be stated too that each piston, 43 or 44, and its respective sleeve operate at almost the same temperature respectively. In addition, because materials with low thermal expansion are used, the clearances between pistons and sleeves can be kept very small, e.g. between 0.001 and 0.002 inches. Small fluid expansion grooves can also be provided around the piston skirts, so as to further limit the extent of fluid leaks between piston and sleeve. No side forces are exerted on the pistons, thus wear can be almost non-existent. However, the presence of particulate dust in the air could prove very detrimental. Such considerations may render the use of bellows inevitable. In such instance, guiding flange 58, orifice 57 and grooves 56 are not needed (FIG. 2). Guiding collar 58' shown centered by spokes 58'' attached to piston 44, in cooperation with receptacles 56' and 56'', will suffice to insure that then-grooveless stem 52 remains properly centered while exerting no side load components on pistons 43 and 44, and/or the bellows end structures which then are equipped with receptacles 56' and 56''. Bellows 66 and its end structure are shown in dotted lines, in lieu of piston 43, as examples. Readers familiar with the art can easily adapt the same design to piston-44/sleeve-46 assembly.

Engine Control System

It would be pointless and much too general to describe a meaningful universal control system applicable to the operation of the present engine without specifying its application. For this reason, a typical application is used herein: that of automotive propulsion, be it cars, buses, trucks, tanks, tractors, etc . . . , hereinafter referred to generically as vehicle or car. General operational requirements are similar in all cases: (1) the power level varies between large limits, (2) such power levels correspond to various combinations of torques and rpm that are imposed by the variety of ground grades and/or vehicle speeds, and sometimes loads, (3) frequent variations or adjustments of these power levels are bound to occur, (4) accelerations of the vehicle must be quick, (5) the engine should be enabled to operate near its design point of maximum efficiency (i.e. minimum specific funnel consumption) most of the time, (6) the possibility of engine operation mishaps or malfunctions must be minimized so that no extra caution is required on the part of any operator (driver), and (7) starting, stopping and/or operating the engine do not differ from the ways conventional gas engines are operated. It is well known in the art that gearboxes or automatic transmissions are used to satisfy many of the requirements listed above. Similar needs can equally be satisfied when gas turbines are used in car propulsion. However, major differences should be pointed out.

First, the rpm ratio between maximum power and idling power settings is much lower than that which conventional piston engines routinely utilize. Second, gas turbines are much more sensitive than piston engines to off-design point operation in terms of specific fuel consumption. Third, the compressor-turbine assembly shaft rotates many times faster than piston engine shafts. Fourth, the starting operation of a gas turbine is more complex and takes longer than that of a piston engine, though cold starts do not present the problems that piston engines sometimes do. And most importantly fifth, a piston engine might start and become self-sustaining after the first shaft revolution, whereas a gas turbine must have to reach at least 10% of its maximum rpm-rating before it is able to reach its idle-rpm setting without some starter assistance.

The present engine may be started like a conventional gas turbine. However, it should be pointed out here that fuel combustion in the combustor could start at an earlier stage of the starting cycle, because of the nature of the pulsating combustion. Discussion of the engine control system is limited to steady-state and transient operating modes between idle and maximum power setting. Out of the seven requirements listed above, only those pertaining to the engine operation between these two rpm limits, regardless of vehicle propulsion application, are considered here. Thus, the following assumptions are made: (1) a clutching and an automatic transmission systems are provided between the vehicle and the engine, (2) the engine power setting is indirectly controlled by a driver who directly adjusts the fuel supply rate in response to the vehicle speed desired and/or quickness of vehicle speed changes, (3) engine operational parameter limits are automatically adjusted or controlled by the engine control system, and (4) the driver can start and stop the engine by switching the ignition on and off, as is done conventionally with cars.

Control of automobile driving is possible with transmission systems such that either of the following engine/vehicle operating parameters will be maintained constant at a set value: (1) vehicle velocity, (2) engine output torque, (3) engine operating regime, i.e. the rpm point of minimum specific fuel consumption, (4) optimum acceleration of the vehicle at the optimum operating regime of the engine, and (5) pertinent combinations of some of the above, as applicable. The present inventor has two Patent Applications now pending that describe and discuss such systems in piston engine applications: (1) Variable Speed Power-Transmitting System, U.S. Ser. No. 929,096 filed 11/10/86, now U.S. Pat. No. 4,747,269, (2) Infinitely Variable (IV) Positive Drive System, U.S. Ser. No. 051,410 filed 05/19/87, now U.S. Pat. No. 4,739,668. Other systems have been patented in which "viscous friction" is used to transmit torques at infinitely variable speed ratios for automotive applications, e.g. U.S. Pat. No. 4,112,779 of Kemper et al., issued 09/12/'78, entitled Variable Speed Transmission Device. Such a system is easily adaptable to automotive applications in which the operational parameters listed above could be controlled to achieve the same vehicle performance goals.

At this juncture, the operation of the present engine can be dissociated from that of the vehicle it propels with the provisions that: (1) the combination of drive shaft torque and rpm is imposed by the vehicle power demand resulting from the vehicle control feedback from the driver, which relates car performance to engine power level setting, and (2) the driver closes the feedback loop by adjusting the flow rate of fuel delivery to the engine. Both steady-state and acceleration engine operating conditions are handled automatically by the engine control system. A list of engine operating parameters is presented in Table C both for later reference and easy identification. P and T refer to a fluid pressure and a corresponding temperature at a given engine station identified by a number, as indicated in FIG. 10.

TABLE C

| | Reference Engine Operating Parameters | |
|---|---|---|
| SYMBOLS | PARAMETER IDENTIFICATION | ENGINE CONTROL USE/REMARKS |
| P0,T0 | Ambient Pressure-Temperature | A Measure of air mass flow |
| P7,T7 | Gas Ex. Pressure-Temperature | A Measure of engine regime |
| P1,T1 | Air at Compressor Outlet | A Measure of compression |
| P2,T2 | Air at Member-40 Inlet | A Measure of Energy Loss |
| P3,T3 | Air in the Combustor | Depends on Fuel Inj./Ign. |
| P4,T4 | Gas at end of combustion | A Measure of Power Level |
| P5,T5 | Gas at Member-40 Inlet | Same as above (reference) |
| P6,T6 | Gas at Turbine Inlet | Most critical Temperature |
| P6',T6' | Gas between Turbine Spools | For reference only here |
| P1/P0 | Compressor Compr. Ratio r | A Measure of Engine Regime |
| P1-P2 | Air Pressure Drop in Member 40 | Penalty for Heating Air |
| T2-T1 | Air heating in Member 40 | Enthalpy Gain from Heat Ex. |
| P4-P5 | Gas Pressure Drop in Combustor | For reference only here |
| P5-P6 | Gas Pressure Drop in Member 40 | Penalty for Cooling Gas |
| T5-T6 | Gas Cooling in Member 40 | Enthalpy Loss from Heat Ex. |
| P4/P1 | Compr Ratio $r_c$ in Combustor | Measure of comb. peak pres. |
| P6/P0 | Gas Exp. Ratio $\rho$ in Turbine | Measure of Gas Pot. Energy |
| P6/P1 | Compr. Ratio $r_s$ of Combustor | Free-Piston contribution |
| P4/P0 | Max. Engine Compr. Ratio $r_m$ | A Measure of Engine Efficiency |
| P7/P0 | Gas Expansion Ratio to Atm. | Energy Loss from Gas Exhaust |
| T7-T0 | Engine Cycle Enthalpy Loss | Has no significance here |
| N1 | Compressor-Turbine rpm | Measures Engine Power Level |
| N2 | Drive-Shaft/Turbine rpm | Factor of Engine Power Level |
| Q | Drive-Shaft Output Torque | Factor of Engine Power Level |
| Wa | Mass Air Flow Rate | Measure of Engine Power Level |

TABLE C-continued

| | Reference Engine Operating Parameters | |
|---|---|---|
| SYMBOLS | PARAMETER IDENTIFICATION | ENGINE CONTROL USE/REMARKS |
| Wf | Fuel Supply Flow Rate | Adjusted indirectly through p |
| p | Engine Power Level Setting | % of maximum full-rpm Power |

Notes:
(1) The abbreviations used in Table C above stand for: Ex. → exhaust from the turbine outlet, Inj. → injection Ign. → ignition, Compr. → compression, Exp. → expansion comb. → combustion, Pot. → Potential, Max. → maximum Atm. → atmosphere (Ambient), % → percentage pres. → pressure
(2) "Air" and "Gas" refer to compressed air and combusted gas.

Rotating machineries handling either compression or expansion of compressible fluids dynamically, as opposed to volumetric handling thereof, follow compressible-fluid-flow similitude laws in their operation, for any fixed configuration of a given machinery. More specifically, five operational parameters of interest here become dimensionless by nature when corrected by a dimensional correction factor. These fiver parameters are: Wa, Wf, N (rpm), P and T. The dimensions to be removed pertain to the atmospheric (or ambient) conditions expressed by PO and TO. In a given gas turbine, the characteristics of air and gas mass flows, pressures and temperatures existing at given fixed locations inside the gas turbine remain invariable if expressed as a function of corrected rpm values. These corrections are: $\pi = Po/PO$ and $\tau = To/TO$, if Po and To are the actual ambient conditions, and PO and TO correspond to Standard Atmosphere conditions, i.e. 15° C. and 760-mm of mercury at Sea Level. The actual values of the parameters above then need be corrected as follows: $Wa = Wa^* \cdot (\pi/\sqrt{\gamma})$, $Wf = Wf^* \cdot (\pi/\sqrt{\tau})$, $N = N^*/\sqrt{\tau}$, $Po = PO \cdot \pi$ and $To = TO \cdot \tau$. Thus, once a nominal value of these five parameters has been established for a given gas turbine, the various relationships between each other do not vary if expressed in their dimensionless form. In fact it suffices to detect the actual values Po and To at the turbine inlet and to apply the corrections indicated to N and Wf to insure that the correct amount of fuel is mixed with Wa that is known, if and when N, Po and To are known. It is obvious to one skilled in the art that pressure and temperature (if expressed in absolute values) ratios need not be corrected, though their respective differences should be.

This completely differentiates gas turbines from piston engines operating according to an OTTO Cycle in which admission of ambient air to the engine is throttled and requires monitoring, as performed by carburetors. The gas turbine of the present engine behaves as a conventional gas turbine from that standpoint. Thus, the air mass flow admitted in the compressor needs not be determined indirectly, but can be calculated directly from detected values of N, Po and To, using the known equation that always characterizes that given engine, such as: $Wa(\pi\sqrt{\tau}) = \psi(N/\sqrt{\tau})$ (2).

In equation (2), N represents the compressor rpm, i.e. N1 of FIG. 10. If turbine 22 has only one spool, N1 and N2 are the same and referred to as N. To simplify matters, provision (1) earlier mentioned is hereinafter considered to apply equally to both cases of engines with one-spool and two-spool turbines. A direct consequence thereof is that the engine power level is singularly and unequivocally defined by singularly associated and corresponding values of both torque and rpm. Thus, a corresponding singular value of $Wa^*$ results whenever a corresponding singular value of $Wf^*$ is associated with that value of $Wa^*$. The implied simplifying assumption being made now is that to a given value of p correspond: (1) one value of $N^*$, (2) one value of $Wa^*$, (3) one value of $Wf^*$, and (4) one value of $Wa^*/Wf^*$ referred to as air/fuel mixture ratio $R^*$. $R^*$ of course determines the values of T4 directly and P4 indirectly. This assumption enables the formulation of a simple engine control system, as described and discussed below.

The curves of FIG. 13 indicate how $Wa^*$, $R^*$, $R6^*$ and p typically vary with $N^*$. The curve of FIG. 14 shows the relationship existing between $Wf^*$ and $N^*$. This relationship is singularly defined for a values of $N^*$ only if provision (1) and the simplifying assumption made above hold true. Otherwise, if not, a family of such curves would be needed to represent the gamut of possible combinations of rpm and torque that correspond to each one of the various set reduction gear ratios of a gearbox for instance. The engine control system and its operation can now be described and discussed. Three typical operational cases are of most interest: (1) steady-state at an intermediate power level setting, (2) control of the limits of some critical parameters at maximum power setting, and (3) typical monitoring of an engine acceleration from a low power level setting to a high power level setting.

Steady-State Engine Control

In such instance, the driver has previously set the power level at $p^*$, which has caused a fuel flow rate Wf' to be delivered steadily to combustor 70. A closed-loop control is not in operation then. The only control loop in action is closed by the driver who is enabled to change $p^*$ according to the conformance (or lack thereof) of the vehicle performance to results expected by the driver. If the road grade changes, the automatic transmission adjusts the Q-to-N relationship accordingly. The vehicle velocity adjusts itself also accordingly. If the driver wishes to maintain the vehicle speed, he (she) must adjust p from setting $p^*$ to another new setting $p^{**}$ that will hopefully restore the previous value of the vehicle speed.

As an example, next, one can assumed that the car has started climbing a mountain from close to sea level. The power level setting p' is close to the maximum value of p. As the car altitude icreases, the atmospheric pressure decreases and the ambient air temperature usually decreases, but may also increase. If corrections for air density variations were not made, R would automatically decrease and T4 would increase dangerously, though the driver may try to increase p' to 100% to compensate for the drop in power level. This would of course compound the problem. Nothing needs even be said about the turbine rpm, which might also rise above its safe maximum value. Some measures must be taken so as to automatically prevent this from happening. The present control system shown in the block diagram of FIG. 11 does just that.

At or near the compressor inlet, as shown in FIG. 10, two sensors 150 and 151 detect the ambient temperature and pressure respectively. Corresponding signals are sent to a central processing unit (CPU) 153 that embodies a computer having Wf* and R* values stored for all values of N*, between idle and maximum values of N*. The corrections factors $\pi$ and $\sqrt{\tau}$ are calculated from the Po and To signal values. $\pi$ and $\sqrt{\tau}$ are then used to calculate Wa and then Wf, using the R* value corresponding to p' or using the data given in FIG. 14 curve. A signal is then generated by the CPU representing the actual value that Wf should have. This signal is received by fuel metering device 154 that utilizes a combination of fuel injection pressure, injector area and injection duration to adjust the amount of fuel to be delivered into the air-filled combustion chamber during each stroke of the free piston. Such a device is described and discussed in details in reference (3). and is well known to those skilled in the art. As a result of such automatic controlled correction of Wf, as long as p' maintains its value, N and T6 remain approximately unchanged, though the engine power level has decreased as it should have as Wa itself decreased. The driver has the option to increase the power level setting to a higher value p" which of course should not exceed 100%.

If and when the car comes down the mountain, the reverse process would take place, although inconsequential then. Nevertheless, the automatic corrective steps are still automatically taken by the control system for and at any setting of p that the driver may select. The role and operation of the control system during steady-state conditions are both limited and simple, provided that the engine rpm N and/or T6 do not reach a set limit. As mentioned above, such eventuality will develop into a reality anytime the setting of p is near maximum and whenever Po and/or To vary appreciably. For example and reference, Table D below indicates how Po, To and air density vary with altitude in case of standard atmosphere conditions.

TABLE D

| Values of Po, To and Air Density for Three Altitudes | | | |
|---|---|---|---|
| Altitude (ft) | Po/PO | To (°F.) | do/dO |
| Sea Level (0) | 1 | 59 | 1 |
| 5,000 | 0.832 | 24.9 | 0.8616 |
| 8,000 | 0.743 | 22.2 | 0.786 |

The ratio of actual air density do to sea-level density dO diminishes more slowly than Po/PO as altitude increases because of the influence of the temperature decrease, though one should remember that on a hot day, at altitudes of 8,000 ft, the temperature could be 100° F. One can see that Wa could then be reduced by as much as one quarter during a drive from sea level to an altitude of 8,000 ft on a hot day. Although such occurrences might be rare during the lifetime of some engines, their possibilities cannot be ignored. Such dangers and the means for their prevention are discussed below.

Limitation Control of most Critical Engine Operating Parameters

The most critical operating parameters of the engine at or near maximum power level settings are those which may combine to maximize the stressing of some parts. Stresses are caused by two contributors to part loading, i.e. centrifugal force and pressure loading. Turbine blades are typically the most highly stressed parts in gas turbines. In the present engine, this of course is also true but, in addition, the combustor sleeve and its end closures are exposed to a combination of high pulsating pressures and temperatures, i.e. P4 and T4. However, these statically-loaded parts are alternatively exposed to high peak temperatures and appreciably lower temperatures. Also, they are not totally immersed in the hot gases continuously. These parts may also be easily reinforced or externally cooled. Thus, in the following, only turbine blades will be considered as the weakest link.

The most critical parameters that continuously interact with the turbine blades are: (1) T6, (2) N, and (3) to a much lower degree P6. All three parameters reach their maximum values concurrently during an engine steady-state operation. This is not true during transient operations, i.e. engine acceleration as is discussed later on. Referring back to the mountain climbing example previously described, although P6 may have decreased as the altitude increased. However, N and T6 could not help increase if the driver attempted to maintain vehicle performance, i.e. speed. In such example, it is unlikely that both N and T6 reach their maxima concomitantly because, as earlier discussed, both N and T6 are dependent upon To and do not singularly and unequivocally relate. They do only in their corrected forms. The sensing of T6 by means of thermocouples is state-of-the art, but by no means simple and inexpensive, or considered dependable, after years of operation. Conversely, the sensing of N, also state-of-the-art, is simple, inexpensive and very dependable timewise. For these reasons, the limitation of the most critical parameter T6 is deemed both more reliable and more dependable in the case of the present application if performed indirectly by way of the limitation of N with the proper $\sqrt{\tau}$-correction being applied.

The limitation control of both T6 and N peaks in the present engine control system is accomplished as follows. The signal representing the actual value of N processed as previously described is used to calculate its corresponding dimensionless value N* which is continuously compared to a limit N*$_{max}$ stored in the memory of the CPU computer. If and when this limit is reached, a signal is generated by the CPU and sent to the computing means of Wf so as to override the results of the calculation of Wf performed as earlier mentioned, regardless of the actual values of p, Po and/or To that are signalled into the CPU and still processed accordingly. A closed-loop control system has then taken over the engine-rpm control in a manner such that the actual maximum rpm value of the engine still varies within the limits imposed by the calculated and stored value N*$_{max}$ of N*. It is stressed that the value of p needs not be 100% for such situation to develop, as previously described and discussed. However, if and when, by way of any other action, be it caused by a reduction of p, reduction of altitude, etc..., the value of Wf is reduced below that which the N* limitation commands, the overriding control of Wf by N*$_{max}$ ceases. Readers skilled in the art need no further elaboration on the subject.

This limitation control loop is illustrated in the flow chart and the block diagram of FIGS. 12 and 11, respectively. It is depicted in dotted lines for easy identification. The associated computer loop is also shown and located within the CPU. This limitation control does not interact with and is independent from another overriding-type of fuel-flow control that takes place during engine accelerations when excessive values of T6 could also be reached during short periods of time of a few seconds each. Such transient condition is discussed below.

Scheduled Limiting of T6 During Engine Peak Accelerations

A dangerous engine operating condition will occur whenever a rapid augmentation in power outout level, without proper control, is demanded of the engine. This condition may be typified by a "quick get-away" situation which corresponds to increasing the vehicle speed as fast as possible from a low-p value to a momentary high-p value. Drivers neither have the time, the self-control nor the experience to optimize the rate at which the engine can be accelerated, in contrast to the way positive-displacement engine can be handled. As earlier mentioned, two operational engine idiosynchrasies manifest themselves, the first one characterizes the compressor dynamics and the second one stems from the turbine blade sensitivity to excesses of T6.

The handling of T6 is discussed above. Suffice it to say that higher values of T6 during short bursts are allowable above the maximum limit value of T6 corresponding to long steady-state operations. Thermal shock is then the problem which the blade material faces, not continued elevated stress. From experimental and analytical results, a peak value of T6, e.g. T6ˆ, can be determined as a function of the steady-state T6-temperature that turbine blades are exposed to prior to the engine acceleration initiation, for all values of $N^*$ between idle and full power. A relationship between $Wf^*$ (and/or $R^*$) can be dertermined as a function of $N^*$ to ascertain that the limits of T6ˆ for all values of $N^*$ are always respected. Such curve of $Wf^*$ˆ is shown in FIG. 14 graphs as a function of $N^*$. Thus, during transient conditions, values of $Wf^*$ˆ are continuously calculated and processed as was earlier described for the handling of Wf limitation as a result of $T6_{max}$ limitation control. The similarity is such that the CPU processing of such steps needs no further elaboration.

Stalling of the compressor may be critical for more than one compressor regime, especially for a multi-stage axial compressor in which different stages may preferentially stall at different values of N. For the purpose of this disclosure, only one stall region is assumed as illustrative example of a discussion. It is also assumed to take place at a value of Ns of $N^*$ half-way between idle and maximum values of $N^*$. The engine operating parameter representing stall boundaries best is P1/P0, the form in which the stall phenomena manifest themselves most dramatically. In the present engine embodiment, because of the interfering action of member 40, P1 continuously oscillates between P' and P". Thus, utilizing P1 for establishing meaningful values of P1/P0 may not be the most appropriate manner to proceed, though seemingly the most pertinent and direct one. However, again a singular value of Wf, for each one of $N^*$, corresponds to a value Wa corresponding to the value of P1/P0 which constitutes one point of the stall boundary curve. Thus, a stall boundary curve can also be represented in FIG. 14 graphs to correspond to the stall curve shown in FIG. 13 graphs, as a function of $N^*$. In order to leave a safety margin so as to insure that the stall region will not be penetrated and that T6ˆ will never be reached, a curve $Wf^* = F(N^*)$ can be derived and located at a safe distance below the T6ˆ and stall limit curves.

The now-established data determining curve $Wf^* = F(N^*)$ can be stored in the CPU computer memory. This curve meets the other limit curve of T6 which characterizes the steady-state T6 limitation that the limitation control of $N_{max}$ provides, as previously discussed. Again, whenever the value of p is suddenly increased from a lower steady-state value, Wf is prevented from increasing above the limit just defined, at all values of N, thus of corresponding $N^*$. The extra amount of fuel flow rate Wf between curve $Wf^* = \omega(N^*)$ and curve $Wf^* = F(N^*)$ at a given value of $N^*$ defines and limits the amount of extra amount of engine power that will be available to cause the engine and the vehicle to accelerate. If the driver suddenly increase p from idle to 100%, which would in an uncontrolled situation have otherwise disastrous results, variations of $Wf^*$ as $N^*$ increases follow curve $Wf^* = F(N^*)$ until curve T6max overriding action takes over.

The driver still has the option to increase the p-setting as slow as seems justified by the vehicle driving conditions. Curve S of FIG. 14 graphs, shown in phantom lines, examplifies such an occurrence. A much slower acceleration of the engine and vehicle would result. As was earlier discussed, special provisions for regulating the engine/vehicle deceleration are not needed. Yet if free piston stopping, locking and restarting operations are deemed more burdensome than the electronic handling of low-value limitation of $Wf^*$ as a function of $N^*$, a curve $Wf^*_{min} = f(N^*)$ can be established so as to prevent free piston stops in mid-stroke. Such characteristic curve is derived from analytical and experimental data for a given engine design. The data is handled and processed in the manner described and discussed above. The use of such deceleration-rate limitation reduces the effectiveness of engine braking but may offer practical operational advantages such as decreasing the risks of free-piston false starts and minimizing the amplitudes of compressor output fluctuations.

The programming of various Wa and Wf functions using $N^*$ as a variable is state-of-the-art. The sensing of Po, To and N values and processing thereof by the CPU computer are also state-of-the-art. Further, the compressors and the turbines of such engines do not vary their characteristics to the extent that piston engines do. Their parts do not wear out, they break, which constitutes a major failure and cannot go unnoticed. Thus, the $Wf^*$ characteristic curves established when the engine is first put in operation, remain practically unchanged throughout the engine life. It is believed that the indirect control approach described and discussed above, as applied to engines of the present invention, should prove superior to closed-loop control systems used over the whole range of engine regimes. The overriding limitation control used indirectly for T6 control by means of direct closed-loop control of N seems to be the only justifiable use of closed-loop control in the present application.

Engine Design and Configuration Optimization

As mentioned earlier, the turbine could have only one spool, though multi-staged, in which case the single-spool turbine drives both the compressor and the output drive shaft. It is believed that such engine configuration offers less flexibility of operation than does the double-spool turbine engine, especially during transient operating conditions. This lack of flexibility could however be overcome by means of coupling the control of the engine regime to that of the vehicle-and-transmission through the Wf-control system. The scope of such discussion would be beyond the scope of this disclosure, although pertinent elements of it may be gathered in some of the references last cited.

Four other areas warrant short additional discussions, i.e.: (1) variations in the arrangement of compressor-turbine coupling, (2) engine-control assistance available from compressor-output by-pass, (3) operational improvements in member-40 piston designs, and (4) design and performance of a double air bearing system as applied to the present engine. These four areas are discussed below and are entitled in a manner similar to that followed above.

Design Improvements of Member-40 Double-Piston Assembly

Two operational faults in this assembly design were previously mentioned: (1) the inevitable presence of fluid leaks and the inevitable introduction of particulate dust in the piston-sleeve clearance gap, or (2) the questionable utilization of bellows on the side of the smaller piston exposed to P6. The alternative design approach shown in FIGS. 15-17 described in the previous section is based on the use of two springs retained by flange 58 on either side thereof. Spring 160 especially is enabled to operate at much lower temperatures than would a bellows replacing piston 44. The springs operate only when the ratio of $(P1'-P1'')/P1$ reaches values encountered mostly during transient operating conditions of the engine. Fatigue problems caused by the only-intermittently cycling of either spring, as compared to that of bellows which is continuous, are thus considerably alleviated.

Trapping of particulates between the two pistons and their respective sleeves can also be minimized. The combined actions of piston stepped-incremental rotations, enlarged clearance gaps and particulate-evacuation grooves should prevent clogging of these gaps, hence binding of the pistons within their sleeves. The special flexible seals also previously described accomplish two complementary tasks: they prevent leakages of compressible fluids, which greatly minimizes the likelihood of particulate introduction into the clearance gaps, and the smaller amount of friction introduced by these seals will help dampen out small-amplitude chatterrings of the pistons. Further, the incrementally-stepped piston rotation facilitates the evacuation of particulates that would otherwise become trapped in the seals or about them. Combining longitudinal grooves 173 with circumferential grooves 172 provides the ideal channelling means for particulate evacuation, thus minimizing the temporal growth of seal friction and wear.

Utilization of Compressor Output By-pass

During engine accelerations and for very short whiles, the amount of fuel delivered to the engine might be considerably lower on account of fuel flow scheduling to avoid stall than might be possible if compressor stall could be prevented by some other means, as commonly used in aircraft jet engines, for instance. A most common approach is to bleed-off some air-flow from some stages of the compressor. In the present engine, air can be bled-off at the compressor outlet and by-passed to the inlet of the turbine second spool. It should be emphasized here that this air cannot be introduced at the inlet of the first turbine spool, because P6 is normally quite higher than P1, through P6' is normally appreciably lower than P1. This is of course caused by the extra compression, i.e. $r_s$, that combustion in combustor 70 provides.

The amount of compression energy lost is somewhat recuperated in the added gas expansion energy thus provided, the net energy loss corresponds to the energy lost on account that neither the compression process nor the gas expansion process is performed at a 100% efficiency. Extra losses also are incurred in the ducting process of the bled-off air. The consequences of such intermittent losses are preferable to those of compressor stall, though.

The block diagram of FIG. 11 schematically depicts a compressor output by-pass valve and its functional operation. The by-passed compressed air is admitted to the turbine second spool inlet normally to avoid costly energy losses. However, in instances where P6' may be equal to or slightly higher than P1, it might be impractical or right impossible to vent compressed air into inlet 36' (or 141'), in which case, that air is introduced at inlet 142' in exhaust pipe 24. The energy loss then incurred is compounded by the increase of back pressure P7 that the dumping of this air creates. But, again such momentary condition will prove preferable to compressor stall. The values of P6' can be calculated by the CPU computer program and then compared to those of P1 during engine accelerations. The decision to by-pass compressed air to inlet 141' or 142' is then made by the computer whenever critical values of N* and P1* are reached, i.e. in the vicinity of the stall regime. It should be noted here that this still-prevention feature is used for high-efficiency compressors but not when the compressor design trades off some appreciable degree of efficiency for a lower stall propensity alone.

Double Air-Bearing Design and Performance

Double air-bearings as depicted in FIGS. 8 and 9 offer a considerable advantage over conventional bearings in very hot environments. However, they do not provide the exact positioning of which conventional ball or roller bearings are capable. The self-regulating radial positioning of the shafts relatively to each other and/or to the supporting structure can only be obtained if the shafts are allowed some transversal motion, however small, as particularly explained in reference 5.

The shafts are also, and must be, supported at one additional station along the shaft lengths, i.e. at two points. The use of air bearings is justified only at the hottest station, i.e. at or near turbine 22 first spool inlet station. The shaft may thus be visualized as a cantilevered rotating beam, rigidly supported in a transversal direction at one point and free to move radially in that direction at another point where the air bearing is located. Ball bearings and even roller bearings can be designed to permit small angular oscillating motions of the shafts they support.

Angular amplitudes of such oscillating displacements should remain below limits that correspond to a few thousandths of an inch in the radial direction, at a foot-distance axially from a typical roller bearing. The clearance gap between lands such as 97 or 98 and the inner diameter of their cooperating bore must than also be a few thousandths of an inch. That gap cannot vary much between cold and hot operation modes of the engine. The temperature differences between two shafts could easily be several hundred degrees Fahrenheit. To eliminate the influence of temperature differences, lands such as 97 or 98, and the inner surface of the associated bore facing those lands can be lined with materials having very low coefficients of thermal expansion, i.e. silicon nitride. It is reasonable to assume that a mean radial clearance of 0.002 inch varying between 0.001 and 0.003 inch could be readily obtained within a tolerance of a few tenths of a thousandth of an inch. The sizing of restricting orifices such as 91 and 93 represents hole diameters of 1/64th of an inch for a shaft diameter of one inch, as a rough approximation. The high-pressure air supplied to the air bearings must then be carefully filtered.

Each air cushion such as 92 has an internal volume that is filled with a variable amount of air mass, depending on the pressure existing therein. As the radial air-escape gap is reduced, the air pressure in cushion space 92 or 94 increases but the volume of the air cushion decreases proportionately with the variation of the gap opening. If the air cushion depth is of the order of the air-escape gap opening mean value, the filling of the air cushion space to a higher pressure level may not require as large an increase in the mass of air contained therein as would otherwise be the case. The above of course relates to the response time of the air cushions which must be kept as small as possible. However, the reduction of the air cushion depth brings up another interesting aspect of the operation of such air cushions: that of the influence that air viscosity may have on the air-wedge effects that the relative velocities of the two facing surfaces of the shafts may cause. A discussion in depth of this aspect of air cushions as applied to air bearings for which high linear surface velocities may be involved, as could be the case in the present application, is beyond the scope of this disclosure. However it is worth mentioning here that the shape of bottom surfaces such as 190 and 191 of air pads and the depth of such air pads could be both critical and/or advantageously exploited as discussed qualitatively below.

First, the magnitudes of the loads applied normally to both shaft axes must be evaluated. They are mostly caused by the gyroscopic effects created by the rotation of the compressor-turbine assembly whenever another rotation orthogonally oriented relatively to that of the shaft axes is imposed on the vehicle. Thus, the shaft axis orientation with respect to the vehicle axis is important and it should coincide with that of the vehicle main axis about which the vehicle rolling, pitching and/or yawing angular velocity is maximum. Also, in the case of twin-spool turbines, the two shafts can be caused to rotate in opposite directions. This greatly minimizes the amount of gyroscopic torque applied on the vehicle. An estimation of the magnitude of the forces involved in such dynamic processes should first be made.

It is estimated that the total weight W of the rotating masses could realistically be 100 lbs. The distance D between two bearings located at both ends of the motor could be 1.5 ft. The radius of gyration k of the rotating masses could be about 0.5 ft. The moment of inertia I of the rotating assembly is $I = Wk^2/g$, where g is the gravitational constant (32.17 ft/sec$^2$). The gyroscopic torque Q developed is $Q = I\omega \times \Omega$, where $\omega$ is the angular speed of the rotating masses and $\Omega$ is the instantaneous rolling (rolling being used as a generic expression for either rolling, pitching or yawing motion) velocity of the vehicle. A realistic value of $\omega$ could be 30,000 rpm and the vehicle could reach rolling values of $\Omega$ of 0.5 rad/sec for short instants. This yields a value of 1,220 ft.lb for Q. If one bearing is a fixed roller/thrust bearing, the air bearing will have to resist an instantaneously applied load of about 800 lbs. This load is eight times greater than the rotating assembly weight. This is due to the "amplification" effect created by the influence of $\omega$ on gyroscopic forces, which are ignored in the case of piston engines because they rotate at one fifth to one tenth of the regime of turbines of equivalent power ratings, which means forces of the order of W value.

The effective projected area of the air pads could be as large as 4-sq.in, i.e diameter of 1.5 to 2.0 inches and length of 1.5 to 3.0 inches. This means a differential value of 200 psi between the high and low values reached by air pressures in opposing air cushions, for a concomitant shaft radial displacement of the shaft of possibly 0.003 to 0.004 inch. The amplitude of the corresponding shaft oscillation is negligible ($2 \times 10^{-5}$ rad or $3 \times 10^{-3}$ degrees approximately). This of course means very short response times, as mentioned earlier. The amounts of such pressure variations in the air pads of the outer bearing and the reactions on the vehicle structure of that bearing can be greatly reduced as earlier mentioned by letting the two turbine spools rotate in opposite directions. Nevertheless, the air pads of the inner bearing must still support substantially the same radial loads. Various positional arrangements of the fixed bearings and of the air double-bearing as depicted in FIGS. 18 to 21 could reduce the magnitude of the reactions to gyroscopic moments by factors of two or three for engines of equal power ratings and W-values. Further elaboration on such influence of engine configurations is not justified here. Ways to increase the effective air pressure action in the air cushions is worth noting, though.

If a diameter of 1.5–2.0 inches is assumed for a typical air bearing in the present application, the relative velocity of one facing surface of an air pad with respect to the corresponding other facing surface is about 250 ft/sec at 30,000 rpm, close to naught if both shafts rotate in the same direction or as much as about 500 ft/sec if the two shafts rotate in opposite directions. Referring to FIGS. 8 and 9, structure 101 is fixed, but shafts 25 and 27' rotate. The air pressure in pads 94 is independent of the direction of rotation of shaft 25, whereas the air pressure in pads 92 could be affected by the relative velocity of shaft 25 inner and shaft 27' outer surfaces to some extent, depending on the degree of proximity of the two facing surfaces. When the relative velocity of two surfaces separated by a distance of only 0.008 to 0.012 in reaches 300 to 500 ft/sec, the aerodynamic wedge effect mentioned earlier becomes important. In this context, an embodiment of air cushion modified to exploit the advantages of both pressurized air cushions and wedge effect is partially illustrated in FIGS. 8, 9 and 17, as it applies to the inner bearing air cushions 92.

For reasons earlier given, the depth of air pads 92 should be as small as possible, i.e. nominally 0.010 in. or less. The value $\epsilon$ of the air bearing escape gap is nominally 0.003 in. An ideal wedge can be formed by causing the bottom surface of the air pad to follow the contour profiles 92' shown in dotted lines in FIGS. 8 and 9. The two shafts rotate according to arrows f' and f''. In FIG. 8, duct 91' housing restricting orifice 91 is then moved to a position located next to the edge of each land 96 where the air pad depth is maximum. Longitudinal grooves such as 200 located along the full length of all lands 96 facilitate the escape of the doubly-pressurized air that is then preferentially drawn toward the location where the depth of the air pad is minimum.

The high pressure air is delivered by repositioned ducts 91' at the apex of an almost flat surface having three gently inclined and curved surfaces 92', 92" and 92* that then replace cylindrical bottom surface 92. Thus, at low rpm values, the air pads operate as described in reference 7 and air escapes quasi-uniformally around the air cushion sides. At higher rpm values, the two boundary layers formed next to each facing surface interfere with each other where the sum of the thicknesses of the two boundary layers becomes equal to the air pad depth. It is believed that the boundary layer thicknesses can be increased by the presence of small ridges oriented orthogonally to the local air flow general direction within the air pad, so that the boundary layer interference begins near the outlet of duct 91' in the air cushion. The schematic drawing shown in FIG. 17 of the two partial cross-sections of two closely-positioned surfaces is used to partially represent two associated facing surfaces exhibiting such turbulence-creating ridges. Ridge 201 and 202 profiles are shown in dotted lines to avoid confusion and in a developed linear form.

Each ridge, much smaller than the tooth profiles previously described, is shaped as a hook to resemble the crest of a wave ready to break. The direction or orientation of these crests is such that the micro vortices generated by ridge 201 profiles on one facing surface are urged to rotate in a direction opposite to that of the vortices generated by ridge 202 profiles located on the opposite facing surface. The crest lines are not straight but curved so as to approximately satisfy the orthogonality of local air flow direction and ridge orientation mentioned hereinabove. The bottom surfaces of modified air pads 92 are covered with such ridges and their crests coincide with profile contours 92', 92" and 92*. However, the crests of ridges 202 are located on the inner cylindrical surface of hollow shaft 25 and extend only a fraction of the length (or width) of the air pad as depicted by ridge 203 shown in dotted lines in FIG. 9. It is evident that such complex ridge shapes cannot be machined. They are molded with the ceramic air bearing inserts that are mounted on the shaft structures in a manner such that the dimensions of these inserts remain unaffected by thermal expansions of their supporting shaft infra-structures. The crests of ridges 201 are sharp, whereas the crests of ridges 202 are ground-blunted so as to insure that such blunt crests play their role of metering surfaces by maintaining the value of $\epsilon$ invariable as they pass over lands such as 96 as shafts 25 and 27' rotate in opposite directions.

The size of the ridges will likely correspond to the following typical dimensions: depth—0.002- to 0.003-in., separation distance or pitch—0.015- to 0.020-in., width of the flat portion of the blunted ridge crests—0.003- to 0.005-in. These dimensions are small compared to the lengths of the pad sides that are of the order of one inch and two inches. Yet, they are comparatively large relatively to the air pad average depth and $\epsilon$. At rest, the shafts make solid contact. Prior to starting the engine, the air bearings become pressurized as described in references (5) and (7) by means of a high-pressure compressed-air source. Vice-versa, the pressurization of the air pads does not stop until the shafts have come to rest when the engine is turned off. Thus, sliding contact of the bearing lands is prevented at all times while the shafts are still rotating. It is believed that the transition from engine regimes wherein the contributing support of the air wedge is minor, to higher regimes wherein the air wedge contribution becomes appreciable should and could be gradual and smooth. The shapes and dimensions referred to above can be optimized from the results of extensive analytical and experimental work to such effect. To be meaningful, at maximum rpm, the air wedge effect should contribute at least one third and up to one half hopefully of the total air cushion support, otherwise its used will not justify the saving in extra-compression of the pressurized air or the size reduction of the air bearings, which result from the air wedge effect.

Motor Configuration Discussion

FIGS.1 and 18-21 depict five configurational arrangements of the motor components in the case of a twin spool turbine. Additional arrangements of the two shafts, the compressor and the two turbine spools are conceivable. The removal of the conventional combustion chamber of gas turbines away from the motor structure offers design possibilities to engine designers that are not present in conventional gas turbine designs. However, some design rules should be adhered to in the design optimization of such engine, for instance: (1) the length of the compressed air and especially of the combusted gas ducting should be minimized so as to minimize pressure drop losses therein and to facilitate the use of ducting cross-sections as large as possible for that very reason, (2) the diameters of members 40 and 70 are at least half that of the motor, thus appreciable, and their axes could best be located at equal distances from the motor axis and side by side, thus maximizing engine compactness, (3) by-pass valve 155 is a sizable component but connected only to the motor, thus it should also be positioned close to the motor, but far away from members 40 and 70 if need be, (4) the shaft connecting the compressor to its driving turbine spool should be supported by two bearings separated by as large a distance as possible, those bearings should not be air bearings and one must absorb axial thrust, (5) the compressor inlet should be oriented so as to minimize the amount of pre-heating received by the air entering the compressor and to facilitate the flow of the air from outside the engine compartment to that inlet, (6) the power take-out drive shaft should of course be located on the motor end that faces the vehicle drive axle, (7) the compressed air bled-off for additional compression for use as high-pressure air in the combustor and in the air bearings should be tapped at or near compressor 21 outlet (pressure P1) and upstream of the compressed air inlet to member 40.

Other design guide rules should be followed. Two were earlier mentioned: (1) positioning the motor axis parallel to the vehicle is maximum, and (2) have the two turbine shafts rotate in opposite directions. Also preferred is mounting the high-pressure turbine spool and the compressor on a common shaft, so as to isolate the vehicle operation from that of the main and most critical part of the motor. This leaves only a non-mechanical fluid-type of coupling between the engine and the vehicle driving mechanism. This also removes the vehicle operation from that of the free piston one more step further. These rules are all compatible with one another, not exclusive of one another and can be followed in combination for optimum matching of vehicle and engine characteristics.

Type of Fuels and Combustion Modes

As earlier mentioned, gas turbines are characterized by one highly distinguishing operating feature, as compared to piston-types of other IC engines, the temperature of the gases at the turbine inlet is limited to a maximum value that is substantially lower than the optimum combustion temperature of the fuel. In any event, as happens with Diesel engines, it is advantageous to burn the fuel in a combustion zone where temperatures are higher than those that may eventually exist at a later stage when those gases resulting from the combustion are ready to interact with critical mechanical parts. Dilution of combusted gas from which all oxygen has been removed, i.e. used up, with compressed air in which oxygen remains must take place prior to the enthalpy-extracting process, i.e. polytropic expansion through a mechanical energy extracting mechanism: piston/sleeve or turbine blades. In gasoline or explosion engines (OTTO Cycle), combustion occurs in a premixed combination of fuel and air. There is no admixing of fresh compressed air to combusted gas at a later stage. Thus, the operation of the present engine is compared only to those of Diesel and gas turbine engines, from the standpoint of combustion process and types of fuels. In both cases, fuel is introduced as a jet of fine droplets that penetrate a compressed air mass. The distance that these droplets can travel and/or the volume that the fuel jet can occupy are critical aspects of the combustion process. In Diesel engines, attempts are made to cause the air to "flow by" the intermittently injected fuel jet, whereas in gas turbines, a continuous fuel jet is caused to flow along an air flow in a manner such that the two turbulently interact.

In large Diesel engines, because of the limited distance over which the fuel jet can travel and of the mited solid angle that the jet can encompass, pre-combustion chambers smaller than the "main" combustion chamber are used. The combusted gas therefrom is then introduced in the main combustion chamber where the dilution process takes place. In gas turbine combustion chambers, the compressor output air flow is divided into two compressed air flows, primary flow and secondary flow, as a first approximation. The primary air flow is urged to come into contact with the fuel to form a combustion zone inside a volume confined by walls that enable some of the secondary air to gradually and progressively mix with the very hot combusted gas to dilute it with fresh compressed air and isolate the confining walls above-mentioned from the hot gases. A portion of the secondary air is allowed to flow along these walls to keep external structural walls somewhat cooler until this tertiary air is enabled to reach the turbine inlet as a "sheath-like" layer surrounding the diluted combusted gas. As a first approximation and in general the degree of dilution is greater for gas turbines than it is for Diesel engines.

That extra amount of combusted gas dilution for gas turbines is required because the turbine blades are continuously exposed to and immersed in the combusted gas, whereas the combustion-containing mechanical parts of a Diesel engine are alternatively exposed to combusted gas and cooler ambient air, regardless of the fact that external cooling of these parts is possible for Diesel engines but quasi-impossible in the case of turbine blades. The two cases of the above-discussion apply equally well to the case of the present engine for which the free-piston combustor is analogous to a Diesel combustion chamber and the same gas turbine peak temperature restrictions fully apply. Thus, the extra dilution of combusted gas needed for the turbine operation is not required by the combustor. However, dilution must occur upstream of turbine spool 22'0 inlet to be effective. But, compressed air at pressure P1 cannot be introduced at turbine inlet pressure P6, unless P6 is slightly lower than P1, continuously, systematically and consistently. This condition can only be achieved if and when the effective compression ratio $r_s$ provided by the combustor is no higher than the value needed to make up for pressure drops incurred in heat exchanger 40 and associated ducting. Otherwise, dilution must take place in the combustor. These two basic engine operation modes and their corresponding combustion modes are briefly described and discussed below with the assumption that they roughly yield the same cycle efficiency. A steady-state engine operation at peak power level setting is assumed in both cases as the basis for comparison between these two basic engine operating modes.

Engine Operation without Combustor Compression

In this engine operation the amount of fuel injected during each free piston stroke is just sufficient to deliver combusted gas at a mean pressure P6 slightly lower than P1. This means that the compression ratio r of compressor 21 is roughly higher than $\rho$ (P6/P0), which becomes a rough element of comparison between the two engine operation modes. All of the air compression is accomplished by compressor 21. Some compressed air is then by-passed to turbine inlet 36 and never flows through the combustor, it may even by-pass member 40. This by-passed compressed air flow plays the role of the secondary air flow in a conventional combustion in a smaller amount of air. Peak temperature T4 and pressure P4 are higher than those reached in the second mode case. Thus, a higher degree of combusted gas expansion takes place in combustor 70. A higher degree of combusted gas cooling occurs in heat exchanger 40 and the balance of cooling down to temperature T6 is provided by the mixing with cooler by-passed compresssed air.

Engine Operation with Combustor Compression

In this second mode of operation, all compressed air flows through member 40 and the combustor. No mixing of compressed air with combusted gas takes place outside the combustor. The engine operation is analogous to that which characterizes a Diesel engine combustion chamber, except for fuel auto-ignition. Because the amount of fuel burned must be the same as it is in the first mode case above, the peak values of T4 and P4 must be lower. However, the amount of combusted gas expansion inside the combustor is less than in the first mode case and pressure P5 is substantially higher than P1. The mean value of P6 is also substantially higher than P1. The reader should remember than P1 of the second mode case is appreciably lower than P1 of the first mode case, (lower compression ratio of the compressor). Less cooling of the combusted gas is needed in member 40 and no further cooling happens until expansion takes place in the first turbine spool. It is not known which engine operation mode is more advantageous or should be preferred. However, fuel combustion somewhat differs between the two operation modes, because of the local combustion temperature T4. This should now be discussed in the context of the fuel type burned and of the pollutants produced thereby.

Fuel types and Pollutant Production

As a rule of thumb, the maximum value of T4 results from the combustion locally of a stoichiometric mixture of air and fuel. The fuel combustion is most efficient when the mixture ratio is slightly rich, i.e. very slight excess of fuel, if some fuel has no opportunity to vaporize completely before it starts burning. It is at this time that side chemical reactions such as dissociation of CO2 and nitrogen-oxygen combinations occur. The most objectionable aspect of these reactions is the formation of by-products such as nitrous oxides, commonly referred to as NOX. The degree of production of NOX is directly dependent at $T4$.

Some fuels such as hydrocarbons are a mixture of carbon and hydrogen, both elements burning to produce heat. Some fuels contain oxygen already chemically combined with the carbon and the hydrogen elements, methanol and ethanol are good examples thereof. Two consequences result from the presence of oxygen in the fuel in an already chemically combined form: (1) the vaporization of the fuel in compressed air at a stoichiometric ratio has a greater cooling effect that does an equivalent amount of hydrocarbon, and (2) the amount of heat produced by such fuel type is less than for an equivalent amount of hydrocrbon. Equivalent refers here to the amount of either fuel needed to burn completely and stoichiometrically in a unit mass of air. Obviously more methanol (or ethanol) is needed, so equivalent does not mean equal or even close thereto. In the case of explosion IC engines (OTTO Cycle), the substitution of methanol for gasoline practically eliminates the production of NOX.

In the present engine, the mean peak values of temperature T4 needed are lower than $T4$ obtainable with methanol by at least 200°–300° C., assuming an acceptable value of $T6$ of 1150°–1200° C. at the first turbine spool inlet. Thus, the lower specific heat content of methanol does not have here the drawback from that standpoint that it has when used in explosion IC engines. However, methanol has very poor lubricating properties and pressurizing it to injection pressures may present problems. It is believed that additions of 15 to 20% of heavy hydrocarbon fuels to methanol or ethanol or methanol/ethanol mixtures would greatly ease the fuel injection problem with no significant increase of NOX production. $T4$ would be increased by about 100° C. only, keeping it below the stoichiometric combustion temperature value of hydrocarbons that causes appreciable NOX formation rates. Again, the reader is reminded that a high-energy spark plug fuel ignition system is provided in the present engine and that fuel self-ignition is neither contemplated nor deemed practically possible, i.e. by means of glow plugs for instance.

The use of hydrocarbon-doped methanol, or ethanol, or methanol/ethanol mixtures, has a strong appeal as the choice fuel for EC engines incorporating gas turbines and free-piston combustors. The trade-off of compressor higher compression ratios but no compression in and by the combustor for compressor ower compression ratios but additional compression in and by the combustor is neither affected by nor affects the fuel type selection. Such trade-off choice will result only from considerations unrelated to the preferential use of a certain fuel type. Some of these considerations are: (1) cost of the engine, (2) simplicity and reliability of engine operation, (3) engine overall efficiency (specific fuel consumption), (4) cost of the engine maintenance during the engine lifetime, and (5) length of an engine trouble-free life.

The contemporary trend of emphasizing the use of fuels not derived from crude oils but of less critical origin is compounded by the need of controlling and reducing the amount of exhaust gas pollutants of which NOX is the most objectionable. Free-piston combustors, as indicated in the references cited, increase considerably the time amount provided for fuel combustion. This enables a more complete combustion to take place, which in combination with the lower combustion temperatures acceptable for gas turbines renders the present engine concept ideal in the role of pollutant reducer and of non-user of refined hydrocarbon fuels. Its main advantage over conventional gas turbines resides in its capability of providing some heat transfer from combusted gas to compressed air and to facilitate the use of fuels that may not be as easily burned in conventional gas turbine combustion chambers.

For comparison with the reference to conventional gas turbine combustion chambers, a schematic thereof is shown in FIG. 1 in phantom lines, to indicate their simplicity of construction. One combustion chamber 210 is connected to compressor outlet 35 and to turbine inlet 36. Perforated walls 211 confine the volume in which fuel is injected by continuous-flow injector 212. The compressed air flow is divided into a primary flow 213 and a secondary flow 214. Combusted gas 215 emerges out of the combustion chamber as a mixture of tertiary air and diluted combusted gas generated internally to walls 211 from the mixing of fuel stoichiometric-combustion products in zone 216 with secondary air introduced through perforated walls 211. Large gas turbines such as aircraft jet engines have a plurality of individual combustion chambers, whereas small gas turbines may only have one single combustion chamber. However, in all instances, the general arrangement and operating principle of the combustion chamber(s) are similar.

The complexity of the combustion system arrangement of the engine proposed herein must be weighed against the operational advantages that pulsating combustion offers. This can only be fully assessed and proven by means of considerable analytical, design and experimental work. Also, the motor portion of a gas turbine might advantageously be replaced by simpler mechanical components such as vane motors or rotary motors that rotate at much lower speeds and are stall-insensitive and less fragile. Means exist for eliminating sliding friction between the cooperatively moving surfaces of such motors at the cost of compressed air and combusted gas leakage that is similar to that encountered around the tips of compressor and turbine blades. Also, lubrication can be dispensed with by the same token. Cited references (6), (7) and (8) describe and discuss such alternate possibilities.

It is thought that the gas-turbine/free-piston engine and its method of operation of the present invention and many of its potential advantages will be understood from the foregoing description and it will be apparent that various changes may be made in the form, construction and arrangement of the parts thereof without departing from the spirit and scope of the invention or sacrificing any and all of its material advantages, the form hereinbefore described being merely a preferred or examplary embodiment thereof.

Having thus described my invention, I now claim:

1. A gas turbine engine wherein the fuel combustion occurs pulsatingly in a combustor member including a free piston cooperating with two end closures of a sleeve in which said piston reciprocates for alternatively forming two combustion chambers in which fuel is intermittently injected and compressed air is timely and pulsatingly admitted from an air compressor member and from which combusted gas is continuously but unevenly delivered for expansion in a turbine member driving said compressor and a drive shaft for power usage externally to the engine, said engine comprising:

means for dampening pressuring fluctuations in the compressed air flowing from the compressor outlet to the combustor caused by the compressed-air pulsating admission into the combustor;

means for attenuating pressure variations in the combusted gas flowing from the combustor outlet to the turbine inlet caused by the unevenness of the combusted-gas delivery by the combustor;

means for timely injecting and igniting said fuel;

valving means controlled by the piston motion for admitting a set amount of compressed air into each combustion chamber sequentially and in one at a time, and for exhausting combusted gas out of each combustion chamber in a manner such that delivery of combusted gas is never interrupted when the engine operates; and means for enabling the mean pressure at which combusted gas is delivered by the combustor to exceed the mean pressure under which the compressed air is admitted therein;

whereby the pulsating nature of the fuel combustion is prevented from detrimentally affecting the operations of either one of the compressor member and the turbine member; and whereby combusted gas is enabled to be admitted into the turbine at a pressure higher than the pressure at which the compressor delivers compressed air.

2. The gas turbine engine according to claim 1 wherein both the means for dampening compressed air pressure fluctuations and for attenuating pressure variations in the combusted gas flow cooperate structurally for enabling heat to be exchanged between compressed air and combusted gas, thereby lowering the combusted gas temperature at the turbine inlet, whereby combusted gas is enabled to leave the combustor at higher temperatures, hence higher pressure levels, thereby raising the efficiency of the thermodynamic cycle of the engine.

3. The gas turbine engine according to claim 1 wherein both the means for dampening compressed air pressure fluctuations and for attenuating pressure variations in the combusted gas flow cooperate to form two cavities of varying volumes for enabling excesses of and deficiencies in either compressible fluid flow rates over and under nominal mean fluid flow rates to be timely accommodated so as to prevent substantial pulsating pressure changes in either fluid, and wherein means is provided for causing said cavity volumes to vary correspondingly automatically, and further comprising:

a first piston sliding in a first guiding sleeve;

a second piston sliding in a second guiding sleeve, said second piston having an effective acting surface area generally smaller than that of the first piston;

means for applying compressed-air pressure on one side of the first piston acting surface;

means for applying combusted-gas pressure on one side of the second piston acting surface;

means for applying an adjustable air pressure on the acting facing surfaces of the other sides of both pistons; and means for connecting both pistons in a double-piston reciprocatingly sliding assembly so that the two forces developed by both compressed-air and combusted-gas pressures oppose and balance one another;

whereby: (1) the first and second pistons are enabled to slide as one body between the ends of their respective sleeves, the sleeves having one common end support and one end closure each, thereby causing the formation of the two variable-volume cavities, (2) adjustment of the air pressure in the volume between the two pistons enables the ratio between the combusted-gas and compressed-air pressures to be controllably varied and adjusted, and (3) a set value of said pressure ratio corresponds to an associated set adjusted value of the adjustable air pressure, for a set piston surface area ratio, as determined for a given engine design.

4. The gas turbine engine according to claim 3 wherein the double-piston assembly is enabled to oscillate freely about a nominal mean position located between two end stops of the piston-assembly available total travel, and further comprising:

means for enabling the piston-assembly instantaneous position about said nominal mean position to automatically adjust the air pressure applied on the piston acting facing surfaces so as to define a first limited portion of the total travel within which the position of the piston assembly does not affect the air pressure existing in the volume between the two pistons, and two limited portions of said total travel at each one of the two ends of the first limited portion within which the position of the piston assembly affects the air pressure existing in said volume in a manner such that the piston assembly nominal mean position is urged to remain within the first limited portion of the total travel.

5. The gas turbine engine according to claim 3 wherein the double-piston assembly is enabled to oscillate freely about a nominal mean position located between two end stops of the piston-assembly available total travel, and further comprising:

spring means mounted on each side of the common end support of the sleeves for applying a restraining and restoring force on either one of the two pistons, whenever the piston assembly travels beyond a set distance from the nominal mean position, whereby the piston assembly is urged to remain within a central limited portion of the total available travel; and cooperating ratchet-like means located on each piston and at the free end of each spring for urging the piston assembly to incrementally rotate about its longitudinal axis each time one piston and the free end of its associated spring make contact.

6. The gas turbine engine according to claim 5 wherein each piston includes:

means for preventing compressible fluid leaks between the cavities located on each side of the piston two sides; and groove means for removing and collecting particulate matter entrapped between either piston and its corresponding sleeve sliding surfaces.

7. The gas turbine engine according to claim 1 wherein both the means for dampening compressed air pressure fluctuations and for attenuating pressure variations in the combusted air flow cooperate to form two cavities of varying volumes for enabling excesses of and deficiencies in either compressible fluid flow rates over and under nominal mean fluid flow rates to be timely accommodated so as to prevent substantial pulsating pressure changes in either fluid, and wherein means is provided for causing said cavity volumes to vary correspondingly automatically, and further comprising:

two sets of bellows, each one set having one fixed end and one movable end, both movable ends facing one another and defining a fixed-length cavity, both fixed ends being mounted onto a supporting structure and defining in cooperation with an external structure two variable-volume cavities, the bellows having different effective areas, whereby the product of such effective area by a displacement of the corresponding bellows movable end defines a volume variation of the corresponding variable volume;

means for applying compressed-air pressure in one variable volume and combusted-gas pressure in the other variable volume;

means for adjusting the air pressure in the fixed-length cavity to enable the ratio between the compressed-air and combusted-gas pressures to be controllably varied and adjusted; and fixed-length means for connecting both bellows movable ends so that the forces developed by both compressed-air and combusted-gas pressures continuously oppose and balance one another;

whereby a set value of said pressure ratio corresponds to an associated set adjusted value of the adjustable air pressure, for a set ratio between the bellows movable-end effective areas, per a specified schedule established for a given engine design.

8. The gas turbine engine according to claim 3 wherein the oscillating natural frequency of the double-piston assembly is much higher than that of the free piston so as to enable the double-piston assembly to respond to the pressure variations of both compressed air and combusted gas caused by the free piston oscillating motion without causing detrimental time lag between the two oscillating motions, said engine further comprising:

structural means for enabling each one of the two pistons to be of light weight whilst retaining high temperature strength;

and structural means for enabling the connecting means located between the two pistons to be of light weight and to allow both pistons and their connecting means to remain aligned whilst preventing side loading from being exerted by either piston on its respective guiding sleeve;

whereby the volumes of the two cavities are enabled to accommodate the two compressible fluid flow-rate variations without causing detrimental variations of the two compressible fluid instantaneous pressures about their operating mean values.

9. The gas turbine engine according to claim 1 wherein the turbine comprises two spools, each spool being capable of independent concentric rotation, said engine further including:

means for connecting one first spool to the compressor shaft for the driving thereof; and means for connecting one second spool to the drive shaft for external power usage.

10. The gas turbine engine according to claim 9 wherein the first turbine spool and compressor shaft connecting means includes a hollow shaft housing the drive shaft connected to the turbine second spool, said engine further comprising:

two high-pressure air-cushioned bearings, one being located between the drive shaft and the hollow shaft inner surface, and the other being located between the hollow shaft outer surface and a supporting structure mounted on an engine structural frame;

and self-controlling means for enabling both shafts to remain automatically centered with respect to each other and to the supporting engine-frame structure, said means including a plurality of sets of two restricting orifices in series, the first one of said orifices being of fixed size and admitting air at high pressure, whereas the second one lets air escape externally and is of variable size determined by the distances separating cooperating surfaces of two concentric cylindrical surfaces rotating relatively to each other, whereby such distances diametrically opposed also vary inversely, thereby causing the air pressures between said cooperating surfaces to vary inversely with the variations of said distances, thus providing a self-controlled centering effect on the shafts within their constraining outer surfaces.

11. The gas turbine engine according to claim 10 wherein the bottom surface of each air cushion is shaped so as to form an air wedge in cooperation with a corresponding annular portion of the shaft surface, said engine further comprising:

means located on the air cushion bottom surfaces for generating thick turbulent boundary layers along said surfaces; and means located on the cooperating and corresponding shaft surface annular portions for creating thick turbulent boundary layers along said portions that continuously face a plurality of corresponding annularly-disposed air cushion bottom surfaces;

whereby two opposite boundary layers interact and cooperate to increase the air pressure locally so as to generate two additional aerodynamic forces opposed to each other for urging each air cushion bottom surface to part further away from the corresponding shaft surface, thereby enhancing the self-controlled centering action of each air cushion as the relative angular velocity between the two shafts increases.

12. The gas turbine engine according to claim 9 wherein the maximum rotational speeds of both the compressor-turbine connecting shaft and the second turbine spool drive shaft are automatically limited, wherein the compressor/turbine-first-spool assembly is enabled to adjust its rotational speed below its maximum limit value by means of fuel flow rate adjustment and wherein the turbine-second-spool/drive-shaft assembly is enabled to adjust its rotational speed below its maximum value automatically by means of the torque exerted on the drive shaft by an external power-using system, said engine comprising:

means for adjusting the fuel delivery to the combustor in response to a power level demand set by an engine operator; and means for causing the turbine second spool to transmit a portion of the power generated in the combustor to the drive shaft, the balance of said power being used to drive the compressor.

13. The gas turbine engine according to claim 12 wherein the engine operator directly adjusts the level of the power delivered by the drive shaft by means of the continuous adjustment of the fuel flow delivery rate to the combustor, said adjustment resulting from the automatic action of a control system comprising:

means for generating a signal indicative of the operator power level demand as a fraction of the engine maximum power;

means for sensing the ambient air temperature and pressure and for generating signals indicative of the values thereof;

means for detecting the rotational speeds of both turbine spools and for generating signals indicative of their values;

means for storing data representing values of: (1) fuel flow delivery rates required by the engine for various values of the rotational speeds of the first turbine spool for steady-state engine operation, optimum engine acceleration and deceleration, (2) maxima of the rotational speed of the first turbine spool corresponding to the maximum temperature value of the combusted gas entering the turbine first spool, (3) absolute maxima that the rotational speeds of either turbine spool shaft cannot exceed, (4) minimum of the fuel flow delivery rate at which the engine idles, (5) ratios between the turbine first spool inlet pressure and the compressor outlet pressure, and compressor outlet pressure and the compressor inlet pressure, (6) a regulating air pressure for various values of the turbine first spool rotational speed, and (7) the ratio between the turbine second spool inlet pressure and the compressor outlet pressure for various values of the turbine first spool rotational speed, whereby said stored values correspond to nominal values established for a given engine operating at sea level under standard atmospheric conditions; and means for determining actual values of said nominal stored values for various compressor inlet temperature and pressure values, and which parameters characterizing the engine operation must assume to insure satisfactory engine operating conditions.

14. The gas turbine engine according to claim 13 wherein a three-way by-pass valve is provided between the compressor outlet and either one of the turbine second spool inlet and the turbine exhaust, said engine further comprising:

control means for operating the by-pass valve so that some compressed air flow can be directly diverted from the compressor outlet to either one of two said locations;

whereby compressor stall can be prevented during an engine rapid acceleration.

15. The gas turbine engine according to claim 13 wherein a first by-pass valve is mounted on the pre-heated compressed-air duct connecting the pressure-dampening and combustor members, and a second by-pass valve is mounted on the combusted gas duct connecting the combustor to the turbine first spool inlet, said engine further comprising:

control means for operating said by-pass valves simultaneously to enable some pre-heated compressed air flow to by-pass the combustor by being diverted directly from the heat exchanger outlet to the turbine first spool inlet, in response to the control system whenever engine operating conditions so require.

16. The gas turbine engine according to claim 13 wherein the turbine first spool rotational speed, inlet temperature and pressure, and power delivered are constantly, continuously and automatically adjusted for each engine power level set by the operator, whereas the power delivered by the engine to the drive shaft is enabled to adjust freely to conditions imposed by an external system powered by the engine, said engine further comprising:

means for adjusting instantaneous fuel flow delivery rates to the combustor at all engine regimes between idling and maximum power so that maximum limits of turbine first spool rotational speed, turbine first spool inlet temperature, compressor compression ratio and combustor operation are never exceeded during either one of steady-state and transient operating conditions; and means for enabling the rotational speed of the turbine second spool to reduce said fuel flow delivery rate when a set maximum limit of said rotational speed is exceeded, thereby preventing the possibility of a turbine-second-spool runaway condition.

17. A method of operating a gas turbine engine including air compressing means, fuel injecting and combusting means, means for expanding the combusted gas resulting from the fuel combustion in the compressed air, means for driving an external power shaft and control means for adjusting the level of the power delivered thereby, wherein the compressed-air admission in the fuel combusting means, the fuel injection thereinto, the combusted gas delivery thereby are of a pulsating nature, and wherein the compressed-air delivery by the compressor and the combusted-gas delivery to the turbine must both be continuous, whereas the compressed-air admission into the fuel combusting means must be discontinuous, said engine further including means for temporarily storing compressed air between the compressor outlet and the fuel combusting means, and means for temporarily storing combusted gas between the fuel combusting means and the turbine inlet, whereby: (1) the flow of compressed air at the compressor outlet and the pressure fluctuations thereof, and (2) the flow of combusted gas into the turbine and the pressure variations thereof, can be dampened down to levels compatible with satisfactory operations of both the compressor and the turbine, said method comprising the steps of:

enabling the volume of a cavity located between the compressor outlet and the fuel combusting means inlet to vary so as to accommodate the compressed air flow and concomitant pressure variations caused by the pulsating nature of the compressed air admission into the fuel combusting means;

enabling the volume of a cavity located between the fuel combusting means outlet and the turbine inlet to vary so as to accommodate the combusted gas flow and concomitant pressure variations caused by the fluctuating nature of the combusted gas leathe fuel combusting means; and enabling the compressed air pressure and the combusted gas pressure to cooperate for urging both variable-volume cavities to adjust their volumes synchronously in a manner such that the ratio of the mean values of these two pressures can be adjusted and set by a regulated air pressure determined by the engine operating regime and power outlet level.

18. The method recited in claim 17 wherein the compressed air and the combusted air flows are enabled to exchange heat as they pass through their respective storing means, said method comprising the further steps of:

enabling each one of the two flows to pass along one side of the two sides of a common structural wall during the time spent by each compressible fluid in its respective storing volume; and causing the compressed air temperature to increase while the combusted gas temperature decreases concomitantly;

whereby: (1) less fuel is required to be burned in the fuel combusting means for equal temperature peaks reached at the end of the fuel combustion, and (2) turbine inlet temperatures are concomitantly lowered by the amount of temperature reduction in the combusted gas incurred during the heat exchanging process.

19. The method recited in claim 18 wherein a control system provides means for enabling an engine operator to vary the engine power output by adjusting the rate of fuel delivery to the fuel combusting means, said control system including a central processing unit having a memory, a programmed computer, input and output ports, associated signal lines and means for timely injecting and igniting the fuel in the combustion means, associated engine accessories and actuating means therefore, compressed air by-pass valves and a plurality of compressible fluid temperature/pressure and rotational speed sensors, nominal values of various engine operating characteristics corresponding to engine operation at sea level under standard atmospheric conditions, and relationships therebetween being stored in the memory, whereby fuel delivery rates for steady-state and optimum transient operating conditions, rotational speeds, various engine operating pressures and temperatures are caused to programmably interrelate so as to insure that the amount of fuel delivered never causes limits in rotational speeds, turbine inlet temperature and compressor stall to be exceeded, said method comprising the further steps of:

enabling the engine operator to set a power output level;

sensing the air temperature and pressure existing at the compressor inlet;

sensing the compressor-turbine assembly rotational speed;

determining the actual values of the engine operating parameters from the stored nominal values thereof as corrected by the sensed values of the then-existing ambient air conditions;

calculating the actual fuel delivery rate that corresponds to said actual values of engine operating parameters; and adjusting the fuel delivery rate accordingly;

whereby said fuel delivery rate is a direct function of the engine rotational speed and ambient air conditions in sole response to the operator-imposed power level setting, the engine power output being only an indirect result of the set power output level.

20. The method recited in claim 19 wherein the operator is enabled to safely vary the engine power setting between idling and full power levels as fast as deemed necessary, and the turbine has two spools, a first spool being connected to the compressor by a hollow shaft and a second spool being connected to the external power shaft rotating inside and concentrically with the hollow shaft, and wherein the rotational speeds of both shafts generally differ and are both sensed for processing by the central processing unit, said method comprising the further steps of:

sensing the actual rotational speeds of both shafts;

enabling the rotational speed of the external power shaft to vary freely upon to a set maximum limit;

enabling the central processing unit to correct and override the value of the fuel delivery rate whenever said set maximum limit is exceeded at any and all times;

processing the sensed value of the compressor-turbine shaft for use in the computation of the actual values of the various engine parameters; and limiting the fuel delivery rate between two actual values, a minimum and a maximum, said values corresponding, for each value of the hollow shaft rotational speed, to a fuel delivery rate below and above which, respectively, said rate is prevented to vary, said nominal minimum and maximum values being stored in the memory as a function of the hollow shaft nominal rotational speed, so that undesirable engine operating conditions can be avoided;

whereby: (1) the maximum turbine inlet temperature cannot be exceeded, (2) the maximum hollow shaft rotational speed cannot be exceeded, (3) compressor stall is prevented from developing, and (4) fuel combustion at high air-to-fuel ratios is unimpaired.

21. The method recited in claim 20 wherein one first by-pass valve connects the compressor outlet to either one of the second-spool turbine inlet and of the turbine exhaust, and a set of two second by-pass valves connects the fuel combusting means inlet to to the first-spool turbine inlet so as to by-pass the fuel combusting means and the means for cooling down the combusted gas, said method comprising the further steps of:

enabling the first by-pass valve to direct some of the compressor output to a lower-pressure portion of the gas turbine, so as to avoid compressor stall during a period of maximum engine acceleration; and enabling the set of second by-pass valves to allow some of the compressor output to circumvent the fuel combusting means so as to maintain the fuel-to-air ratio therein above a critical minimum level during a period of maximum engine deceleration.

22. The method recited in claim 18 wherein the two variable-volume cavities are separated by a quasi-constant-volume cavity in which the regulated air pressure is applied, a movable rigid structure separating each variable-volume cavity end from a corresponding end of the quasi-constant-volume cavity and a fixed-length structural link connecting the two movable rigid structures so as to maintain a constant distance therebetween, and wherein pressure adjusting means is provided for defining said regulated air pressure and the effective acting areas of said movable structures remain constant so as to define a fixed ratio therebetween, said method comprising the further steps of:

calculating the setting of the pressure-adjusting means as a function of the hollow-shaft rotational speed so as to determine the pressure level of the air inside the quasi-constant-volume cavity; and establishing a pressure equilibrium condition whereby the ratio between the turbine inlet and compressed air pressures is adjusted at a set value for each value of the hollow shaft rotational speed and corrected to account for variations in ambient air conditions;

whereby the compressed air and turbine inlet pressures are enabled to maintain said set ratio therebetween by urging the cavity variable volumes to accommodate both compressible fluid flow variations that otherwise would have caused said pressures to vary to a much larger extent.

23. The method recited in claim 22 wherein the two shafts are allowed to rotate in different directions so as to minimize the gyroscopic torque created whenever the engine is caused to rotate about an axis non-parallel with the engine shaft axis, which quasi doubles the shaft relative rotational speed, and wherein air cushion bearings are provided between the shaft facing surfaces so as to keep said surfaces separated, a plurality of air cushion cavities being annularly positioned on said facing surfaces, means is provided for automatically causing opposing air cushions to urge said facing surfaces to stay centered relatively to each other so as to insure constant and continuous shaft concentricity, and means is also provided on both facing surfaces for urging air wedges to form between corresponding portions of the counter-revolving facing surfaces, whereby the air wedge action augments rapidly as the relative linear velocity between the two facing surfaces increases, said method comprising the further steps of:

enabling the air pressure inside the cushion cavities to increase whenever the two facing surfaces come closer;

enabling the air pressure inside the cushion cavities to decrease whenever the two facing surfaces move farther apart; and causing the aerodynamic pressure build-up created by the air wedge effect to add to the velocity-insensitive air pressure generated by the air cushion centering means;

whereby a lower degree of pressurization of the compressed air supplied to the air cushions is needed to obtain a similar load-supporting effect from the air cushions.

* * * * *